(12) United States Patent  
Hirano et al.

(10) Patent No.: US 8,710,176 B2
(45) Date of Patent: Apr. 29, 2014

(54) METHOD FOR PRODUCING A SULFONATED POLYARYLETHER BLOCK COPOLYMER

(75) Inventors: Tetsuji Hirano, Yamaguchi (JP);
Nobuharu Hisano, Yamaguchi (JP);
Tatsuya Arai, Yamaguchi (JP);
Masayuki Kinouchi, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 13/410,992

(22) Filed: Mar. 2, 2012

(65) Prior Publication Data

US 2012/0264835 A1 Oct. 18, 2012

Related U.S. Application Data

(62) Division of application No. 11/885,598, filed as application No. PCT/JP2006/304067 on Mar. 3, 2006, now abandoned.

(30) Foreign Application Priority Data

Mar. 4, 2005 (JP) ................................ 2005-060778
Aug. 25, 2005 (JP) ................................ 2005-243728
Aug. 25, 2005 (JP) ................................ 2005-243729
Oct. 25, 2005 (JP) ................................ 2005-309331
Feb. 28, 2006 (JP) ................................ 2006-051530

(51) Int. Cl.
*C08G 75/00* (2006.01)

(52) U.S. Cl.
USPC .......... 528/373; 528/125; 528/171; 528/295; 528/220; 528/27; 528/370

(58) Field of Classification Search
USPC ............ 528/125, 171, 295, 220, 27, 373, 370
See application file for complete search history.

(56) References Cited

U.S. PATENT DOCUMENTS

| 5,403,675 A | 4/1995 | Ogata et al. |
| 6,451,921 B2 * | 9/2002 | Weisse et al. ............ 525/328.5 |
| 7,258,941 B2 | 8/2007 | Hirano et al. |
| 7,923,492 B2 | 4/2011 | Kinouchi et al. |
| 2004/0101730 A1 | 5/2004 | Hirano et al. |

(Continued)

FOREIGN PATENT DOCUMENTS

| EP | 0688824 | 12/1995 |
| EP | 1 274 147 | 1/2003 |

(Continued)

OTHER PUBLICATIONS

European Search Report, EP 11 00 3542—Jul. 25, 2011.

(Continued)

*Primary Examiner* — Shane Fang
(74) *Attorney, Agent, or Firm* — Young & Thompson

(57) ABSTRACT

A method of producing a sulfonated polyarylether block copolymer is provided. The method includes producing a sulfonated polyarylether block copolymer containing a hydrophobic segment having a structural unit represented by formula (5) and a hydrophilic segment having a structural unit having a sulfonic acid groups or derivative thereof incorporated into a structure represented by formula (6). A hydrophilic segment prepolymer having a sulfonic acid group in a potassium salt form and a hydrophobic segment prepolymer are block copolymerized. A proton conductor that includes the sulfonated polyarylether block copolymer is also provided.

14 Claims, 1 Drawing Sheet

(56) References Cited

U.S. PATENT DOCUMENTS

| | | |
|---|---|---|
| 2004/0186262 A1 | 9/2004 | Maier et al. |
| 2005/0069780 A1* | 3/2005 | Kinouchi et al. ............. 429/317 |
| 2007/0083010 A1* | 4/2007 | Onodera et al. ............. 525/242 |

FOREIGN PATENT DOCUMENTS

| | | |
|---|---|---|
| EP | 1 348 716 | 10/2003 |
| EP | 1 394 879 | 3/2004 |
| EP | 1 449 886 | 8/2004 |
| JP | 60-244507 | 12/1985 |
| JP | 8-20716 | 1/1996 |
| JP | 10-21943 | 1/1998 |
| JP | 10-45913 | 2/1998 |
| JP | 11-502249 | 2/1999 |
| JP | 11-67224 | 3/1999 |
| JP | 11-116679 | 4/1999 |
| JP | 200-510511 | 8/2000 |
| JP | 2002-60687 | 2/2002 |
| JP | 2002-524631 | 8/2002 |
| JP | 2002-260687 | 9/2002 |
| JP | 2002-358978 | 12/2002 |
| JP | 2003-31232 | 1/2003 |
| JP | 2003-64181 | 3/2003 |
| JP | 2003-68326 | 3/2003 |
| JP | 2003-511510 | 3/2003 |
| JP | 2003-206354 | 7/2003 |
| JP | 2003-217614 | 7/2003 |
| JP | 2003-234014 | 8/2003 |
| JP | 2003-297145 | 10/2003 |
| JP | 2004-2596 | 1/2004 |
| JP | 2004-31307 | 1/2004 |
| JP | 2004-83663 | 3/2004 |
| JP | 2004-190002 | 7/2004 |
| JP | 2004-190003 | 7/2004 |
| JP | 2004-307629 | 11/2004 |
| JP | 2004-346305 | 12/2004 |
| JP | 2005-126684 | 5/2005 |
| JP | 2005-139432 | 6/2005 |
| WO | 2006/051064 | 5/2006 |

OTHER PUBLICATIONS

European Search Report, EP 11 00 3543—Jul. 25, 2011.
Extended European Search Report dated Jun. 27, 2011 in corresponding European Application No. 11003544.1.
European Search Report—Sep. 17, 2010—PCT/JP2006/304067.

* cited by examiner

METHOD FOR PRODUCING A SULFONATED POLYARYLETHER BLOCK COPOLYMER

CROSS REFERENCE TO RELATED APPLICATIONS

This application is a division of co-pending application Ser. No. 11/885,598 filed on Sep. 4, 2007, which is a National Stage of PCT/JP2006/304067 filed on Mar. 3, 2006, which claims foreign priority to Japanese Application Serial Nos. 2005-060778, 2005-243728, 2005-243729, 2005-309331 and 2006-051530 filed on Mar. 4, 2005, Aug. 25, 2005, Aug. 25, 2005, Oct. 25, 2005 and Feb. 28, 2006, respectively. The entire content of each of these applications is hereby expressly incorporated by reference.

TECHNICAL FIELD

The present invention relates to a polymer electrolyte composed of an aromatic block copolymer having an improved proton conductivity, an electrolyte membrane thereof, and a fuel cell using them.

The polymer electrolyte of the present invention and electrolyte membrane thereof have an excellent proton conductivity, so that they are suitably used for fuel cells.

Further, the present invention relates to a polymer electrolyte composition used for fuel cells, ion exchange membranes and others, and the use thereof, particularly to a hydrocarbon polymer electrolyte composition having sulfonic acid groups. In addition, the present invention relates to a polymer electrolyte membrane that is composed of the polymer electrolyte composition used for fuel cells, ion exchange membranes and others.

Still further, the present invention relates to a fuel cell that employs the above-mentioned polymer electrolyte composition and polymer electrolyte membrane.

Still further, the present invention relates to a production method of a sulfonated polyarylether block copolymer, and a block copolymer that is synthesized by the production method.

A polymer electrolyte and an electrolyte membrane thereof that are composed of the sulfonated polyarylether block copolymer synthesized by a production method according to the present invention has an excellent proton conductivity, so that they are suitably used for fuel cells.

Still further, the present invention relates to a polymer electrolyte membrane used for fuel cells, ion exchange membranes and others, and a production method of the polymer electrolyte membrane, particularly to a production method of a hydrocarbon polymer electrolyte membrane having strong acid groups or superstrong acid groups.

BACKGROUND ART

In view of recent environmental problems, there has been growing expectation for fuel cells, particularly for polymer electrolyte fuel cells using a proton conductive polymer electrolyte membrane because the fuel cells can be operated at low temperatures and have a possibility of reduction in size and weight. As the polymer electrolyte used for the polymer electrolyte fuel cells, there is known a fluoro-polymer having superstrong acid groups that is represented by, for example, "Nafion" (Nafion is a registered trademark of DuPont, hereinafter the same). However, the fluoro-polymer having superstrong acid groups is extremely expensive since it is a fluoro-polymer, and also the fluoro-polymer has a relatively low heat resistance, a high alcohol permeability, and a disadvantage that environmental consideration is necessary on preparation and disposing of the fluoro-polymer.

In order to address the disadvantages that the fluoro-polymer having superstrong acid groups is expensive, and has relatively low heat-resistance and high alcohol permeability, a number of proposals have been already submitted for a polymer electrolyte membrane based on a less expensive non-fluoro polymer. In particular, in view of durability, heat resistance, and cost of the polymer electrolyte membrane, a hydrocarbon aromatic polymer electrolyte is desirable. As the polymer electrolyte membrane, there are disclosed, for example, in Japanese Patent Application Laid-Open No. H11-502249 (Patent Document 1), Japanese Patent Application Laid-Open No. 2002-524631 (Patent Document 2) and others, a sulfonated polyetherketone polymer electrolyte membrane; in Japanese Patent Application Laid-Open No. 2000-510511 (Patent Document 3), Japanese Patent Laid-Open Publication No. 2003-64181 (Patent Document 4), Japanese Patent Laid-Open Publication No. 2003-68326 (Patent Document 5) and others, a sulfonated polyimide polymer electrolyte membrane; in U.S. Pat. No. 5,403,675 (Patent Document 6) and others, a polyarylene polymer electrolyte membrane; and in Japanese Patent Laid-Open Publication No. H10-21943 (Patent Document 7), Japanese Patent Laid-Open Publication No. H10-45913 (Patent Document 8), Japanese Patent Laid-Open Publication No. H11-116679 (Patent Document 9) and others, a sulfonated polyethersulfone polymer electrolyte membrane. Further, Japanese Patent Laid-Open Publication No. H11-67224 (Patent Document 10) and others disclose a membrane/electrode assembly using a sulfonated polyethersulfone polymer electrolyte membrane.

The improvement of properties on water-absorption has been requested, and a block copolymer has been proposed as the means for solving the problem. For example, there are disclosed, in Japanese Patent Laid-Open Publication No. 2002-60687 (Patent Document 11), Japanese Patent Laid-Open Publication No. 2004-190002 (Patent Document 12), Japanese Patent Laid-Open Publication No. 2004-190003 (Patent Document 13), Japanese Patent Laid-Open Publication No. 2004-346305 (Patent Document 14) and others, polyether; and in Japanese Patent Laid-Open Publication No. 2002-358978 (Patent Document 15), Japanese Patent Laid-Open Publication No. 2003-234014 (Patent Document 16), Japanese Patent Application Laid-Open No. 2003-511510 (Patent Document 17) and others, polyimide. Further, Japanese Patent Laid-Open Publication No. 2003-31232 (Patent Document 18) discloses a polyether sulfone block copolymer that has an improved temperature dependence of proton conductivity. However, there is not any description on the relationship between the ion exchange capacity and proton conductivity of the hydrophilic segment of the block copolymers in these Patent Documents. Still further, Japanese Patent Laid-Open Publication No. 2005-126684 (Patent Document 19) and Japanese Patent Laid-Open Publication No. 2005-139432 (Patent Document 20) also disclose a sulfonated polyether block copolymer, but there are not any descriptions about the proton conductivity under low-humidity conditions, also there are not any specific descriptions about the membrane properties on water-absorption.

As the above-mentioned block copolymers, particularly a block copolymer exemplified in Japanese Patent Laid-Open Publication No. 2003-31232 (Patent Document 18) and others is desirable from the viewpoint of heat-resistance, durability and cost, since the block copolymer has a polyarylether sulfone type or a polyaryletherketone type on both segments, having no specific linking group that connects both segments, and is synthesized not through a reaction using a metal complex such as coupling reaction. In particular, it is desirable because of low cost that the block copolymer is prepared as follows: a prepolymer serving as a hydrophilic segment is synthesized using a dichloride compound having sulfonic acid groups as a source material; and then the prepolymer and a hydrophobic segment prepolymer that is synthesized separately are reacted through ether-exchange reaction.

Japanese Patent Laid-Open Publication No. 2003-206354 (Patent Document 21) discloses the production method of a polyarylethersulfone block copolymer using ether-exchange reaction. However, this document describes about a hydrophilic segment prepolymer having no sulfonic acid groups. There are not any specific descriptions about the method of synthesizing the block copolymer through ether-exchange reaction using a hydrophilic segment prepolymer that has sulfonic acid groups As the dihalide compound having sulfonic acid groups that is used for the synthesis of polyarylethersulfone or polyaryletherketone that has sulfonic acid groups, there are mainly used a dihalide compound that contains fluorine and chlorine as halogen element. However, the dihalide compound that has sulfonic acid groups and contains fluorine as halogen element is expensive. For the synthesis of sulfonated polyarylethersulfone, in most cases, as the alkali metal salt of the dichloride having sulfonic acid groups, a sodium salt has been specifically used so far. However, the problem is that the block copolymer is hardly synthesized through ether-exchange reaction even though a hydrophilic segment prepolymer having a sodium salt as a sulfonate group is synthesized using the sodium salt of the dichloride having sulfonic acid groups, and then block-copolymerized using the synthesis.

The polymer electrolyte membrane described above is produced in an industrial process as follows: a polymer electrolyte solution is continuously cast on a support and heated so as to evaporate the solvent until a self-supporting membrane is formed; and then the self-supporting membrane is peeled off from the support. As the support, a belt of a metal such as stainless steel is used in general. The polymer electrolyte membrane having strong acid groups or superstrong acid groups is not easy to peel off as a self-supporting membrane from the metal belt such as a stainless steel belt, and the membrane is sometimes broken or scared during peeling off. Use of phosphate ester and/or salt between phosphate ester and amine as a separating agent is disclosed in the method for adding to a solution of polyamide acid that is a polyimide precursor in Japanese Patent Laid-Open Publication No. S60-244507 (Patent Document 22). However, there are not any descriptions about the production of the polymer electrolyte membrane having strong acid groups such as sulfonic acid or phosphoric acid or superstrong acid groups such as fluorinated alkylsulfonic acid.

Fuel cells installed in vehicles such as automobiles are required to be small in weight and volume and cannot be attached with a large humidification apparatus. Therefore, high proton conductivity is required under low humidity conditions. To improve the proton conductivity, increase of the ion-exchange capacity is effective, but to the contrary there was a problem that the membrane properties on water-absorption are lowered. In this way, a membrane having still higher proton conductivity has been requested among the membranes that have the same ion-exchange capacity.

When the ion-exchange capacity is increased so as to maintain adequate proton conductivity, the membrane properties on water-absorption is lowered. As a measure, a blend with a non-sulfonated polymer has been proposed. For example, in Japanese Patent Laid-Open Publication No. H08-20716 (Patent Document 23), there is disclosed a composition that is composed of sulfonated polyetherketone, polysulfone and a hydrophilic polymer; and also in Japanese Patent Laid-Open Publication No. 2002-260687 (Patent Document 24), there is disclosed a composition that is composed of polyimide and a block copolymer having sulfonic acid groups. Further, in order to improve the adhesion to electrode layers, a composition that is composed of an aromatic polyether and a sulfonated aromatic polyether and has a flow start temperature of from 100° C. to 220° C. is disclosed in Japanese Patent Laid-Open Publication No. 2004-307629 (Patent Document 25). However, in the case of a blend of a sulfonated homopolymer or a random copolymer with a non-sulfonated polymer, and a blend of a block copolymer having sulfonic acid groups with a non-sulfonated polymer that does not have the similar structure unit to the block copolymer, when the non-sulfonated polymer is blended to an extent at which improved membrane properties on water-absorption are attained, the proton conductivity is largely lowered at low humidity although there are not any problems on the proton conductivity at high humidity. On the other hand, when the non-sulfonated polymer is blended in an amount at which the proton conductivity at low humidity is not lowered largely, there was a problem that the membrane properties on water-absorption was not sufficiently improved.

Patent Document 1: Japanese Patent Application Laid-Open No. H11-502249
Patent Document 2: Japanese Patent Application Laid-Open No. 2002-524631
Patent Document 3: Japanese Patent Application Laid-Open No. 2000-510511
Patent Document 4: Japanese Patent Laid-Open Publication No. 2003-64181
Patent Document 5: Japanese Patent Laid-Open Publication No. 2003-68326
Patent Document 6: U.S. Pat. No. 5,403,675
Patent Document 7: Japanese Patent Laid-Open Publication No. H10-21943
Patent Document 8: Japanese Patent Laid-Open Publication No. H10-45913
Patent Document 9: Japanese Patent Laid-Open Publication No. H11-116679
Patent Document 10: Japanese Patent Laid-Open Publication No. H11-67224
Patent Document 11: Japanese Patent Laid-Open Publication No. 2002-60687
Patent Document 12: Japanese Patent Laid-Open Publication No. 2004-190002
Patent Document 13: Japanese Patent Laid-Open Publication No. 2004-190003
Patent Document 14: Japanese Patent Laid-Open Publication No. 2004-346305
Patent Document 15: Japanese Patent Laid-Open Publication No. 2002-358978
Patent Document 16: Japanese Patent Laid-Open Publication No. 2003-234014
Patent Document 17: Japanese Patent Application Laid-Open No. 2003-511510
Patent Document 18: Japanese Patent Laid-Open Publication No. 2003-31232
Patent Document 19: Japanese Patent Laid-Open Publication No. 2005-126684
Patent Document 20: Japanese Patent Laid-Open Publication No. 2005-139432
Patent Document 21: Japanese Patent Laid-Open Publication No. 2003-206354
Patent Document 22: Japanese Patent Laid-Open Publication No. S60-244507

Patent Document 23: Japanese Patent Laid-Open Publication No. H08-20716
Patent Document 24: Japanese Patent Laid-Open Publication No. 2002-260687
Patent Document 25: Japanese Patent Laid-Open Publication No. 2004-307629

DISCLOSURE OF THE INVENTION

Problems to be Solved by the Invention

An object of the present invention is to provide a sulfonated aromatic polymer electrolyte that is inexpensive and durable and keeps high proton conductivity, an electrolyte membrane thereof, and a production method and a use thereof.

Further, an object of the present invention is to provide a polymer electrolyte composition that has improved properties on water-absorption without lowering largely the proton conductivity at low humidity, a membrane that is composed of the polymer electrolyte composition, and a fuel cell using them.

Furthermore, an object of the present invention is to provide a production method of a sulfonated polyarylether block copolymer that is inexpensive and durable and keeps high proton conductivity, and a block copolymer that is obtained by the production method.

Still further, an object of the present invention is to provide a production method of a polymer electrolyte membrane, wherein a self-supporting membrane is easily peeled off from a support such as a metal belt including a stainless steel belt when a membrane composed of a polymer electrolyte having strong acid groups or superstrong acid groups is produced.

The present inventors have made intensive studies to attain the aforementioned objectives and found that an electrolyte and an electrolyte membrane that are composed of an aromatic block copolymer having a hydrophilic segment with sulfonic acid groups exhibit an extremely improved proton conductivity when the aromatic block copolymer has an ion-exchange capacity in a specific amount or more. Thus, present invention has been accomplished based on these findings.

Further, the present inventors have found that a polymer electrolyte composition that is composed of a sulfonated block copolymer (A) and an aromatic polymer (B) without sulfonic acid groups provides an improved property on water-absorption while suppressing the lowing in the proton conductivity at low humidity that is accompanied by blending, wherein the copolymer (A) and the polymer (B) each have aromatic rings in its main chain, and the copolymer (A) is composed of a hydrophilic segment having sulfonic acid groups and a hydrophobic segment having no sulfonic acid groups. Thus, the present invention also has been accomplished based on this finding. The prevent inventors have also found that a membrane of the polymer electrolyte composition of the present invention provides an effect of increasing proton conductivity at low humidity as compared with a membrane that is composed of only a sulfonated block copolymer having the similar structure to the copolymer used in the composition of the present invention, in the case where both membranes have the same ion-exchange capacity. Thus, the present invention also has been accomplished based on this finding.

Still further, the present inventors have found that even a hydrophilic segment prepolymer that is synthesized using a inexpensive sulfonated aromatic dichloride compound can allow the block copolymerization with a hydrophobic segment prepolymer to proceed and provide a sulfonated polyarylether block copolymer by using a hydrophilic segment prepolymer having sulfonic acid groups in potassium salt form. Thus, the present invention also has been accomplished based on this finding.

Still further, the present inventors have found that a self-supporting membrane is easily peeled off from a support after a polymer electrolyte solution that is admixed with a phosphate ester and/or salt between phosphate ester and amine is cast on a support and heated to dry, and found that polymer electrolyte membrane can be produced continuously. Thus, the present invention also has been accomplished based on this finding.

Means for Solving the Problems

The present invention (hereinafter, referred to as "the first aspect") relates to a polymer electrolyte comprising a hydrophilic segment having sulfonic acid groups and a hydrophobic segment having no sulfonic acid group, each segment having an aromatic ring in its main chain, wherein the polymer electrolyte is an aromatic block copolymer having an ion-exchange capacity $IEC_a$ of solely the hydrophilic segment at 3.6 mmol/g or more calculated from the following equation, and an ion-exchange capacity IEC of the block copolymer in the range of from 0.5 mmol/g to 3.0 mmol/g.

$$IEC_a = \frac{IEC \times W}{W_a} \qquad \text{[Mathematical 1]}$$

wherein IEC is an ion-exchange capacity of the block copolymer, W is a weight of the block copolymer, and $W_a$ is a weight of the hydrophilic segment in the block copolymer.

Further, the present invention relates to a polymer electrolyte membrane comprising the polymer electrolyte of the first aspect, and having a thickness of from 5 μm to 200 μm.

Still further, the present invention relates to a membrane/electrode assembly comprising the polymer electrolyte membrane of the above.

Still further, the present invention relates to a solid polymer electrolyte fuel cell comprising the polymer electrolyte of the first aspect or the membrane/electrode assembly of the above.

Still further, the present invention relates to a direct liquid fuel injection-type fuel cell using the polymer electrolyte of the first aspect or the membrane/electrode assembly of the above, comprising using alcohol or ether as a fuel.

Further, the present invention (hereinafter, referred to as "the second aspect") relates to a polymer electrolyte composition comprising: a sulfonated block copolymer (A) composed of a hydrophilic segment having sulfonic acid groups and a hydrophobic segment having no sulfonic group, each segment having an aromatic ring in its main chain; and an aromatic polymer (B) having no sulfonic acid group and having the same structural unit as a structural unit contained in a hydrophobic segment of a sulfonated block copolymer; wherein a weight fraction $P_b$ of the aromatic polymer (B) is in the range of from 0.03 to 0.4 calculated from the following equation.

$$P_b = \frac{W_B}{W_A + W_B} \qquad \text{[Mathematical 2]}$$

wherein $W_A$ is a weight of the sulfonated block copolymer (A); and $W_B$ is a weight of the aromatic polymer (B).

Further, the present invention relates to a polymer electrolyte membrane comprising the polymer electrolyte composition of the second aspect, and having a thickness of from 5 μm to 200 μm.

Still further, the present invention relates to a membrane/electrode assembly comprising using the polymer electrolyte composition of the second aspect.

Still further, the present invention relates to a solid polymer electrolyte fuel cell comprising the polymer electrolyte composition of the second aspect or the membrane/electrode assembly.

Still further, the present invention relates to a direct liquid fuel injection-type fuel cell using the polymer electrolyte composition of the second aspect or the membrane/electrode assembly, comprising using alcohol or ether as a fuel.

Further, the present invention (hereinafter, referred to as "the third aspect") relates to a method for producing a sulfonated polyarylether block copolymer, comprising producing a sulfonated polyarylether block copolymer containing a hydrophobic segment having a structural unit represented by the following formula (5) and a hydrophilic segment having a structural unit having sulfonic acid groups or derivative thereof incorporated into a structure represented by the following formula (6), wherein a hydrophilic segment prepolymer having sulfonic acid groups in a potassium salt form and a hydrophobic segment prepolymer are block copolymerized.

[Formula 1]

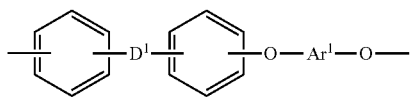

(5)

wherein $D^1$ is $SO_2$ or CO; and $Ar^1$ is a divalent aromatic residue bonded an electron-withdrawing group in every aromatic ring belonging to $Ar^1$.

[Formula 2]

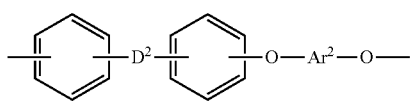

(6)

wherein, $D^2$ is $SO_2$ or CO; and $Ar^2$ is a divalent aromatic residue.

Further, the present invention relates to a sulfonated polyarylether block copolymer produced by the production method of the third aspect.

Still further, the present invention relates to a proton conductor comprising using the above sulfonated polyarylether block copolymer.

Further, the present invention (hereinafter, referred to as "the forth aspect") relates to a method for producing a polymer electrolyte membrane, comprising producing a polymer electrolyte membrane having a strong acid group or a superstrong acid group by casting, wherein a polymer electrolyte solution containing from 0.0005 part to 2 parts by weight of a phosphate ester represented by the following formula (11) and/or a salt between an amine represented by the following formula (12) and a phosphate ester represented by the following formula (11) with respect to 100 parts by weight of a polymer electrolyte, is cast on a support, heated until a solvent of the solution is evaporated to form a self-supporting membrane, and the self-supporting membrane is peeled off from the support.

[Formula 3]

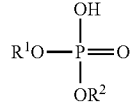

(11)

wherein $R^1$ is a hydrogen atom, an alkyl group having 6 to 18 carbon atoms, or a group represented by the following formula (13); and $R^2$ is an alkyl group having 6 to 18 carbon atoms or a group represented by the following formula (13),

[Formula 4]

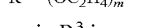

$$R^3—(OC_2H_4)_m—\qquad\qquad(13)$$

wherein $R^3$ is an alkyl group having 5 to 18 carbon atoms; and m is an integer of from 2 to 30.

[Formula 5]

(12)

wherein $R_4$ to $R_6$ each are a hydrogen atom, a hydroxyethyl group, or an alkyl group having 1 to 12 carbon atoms.

Further, the present invention relates to a polymer electrolyte membrane produced by the method for producing a polymer electrolyte membrane of the forth aspect.

BEST MODE FOR CARRYING OUT THE INVENTION

Figure 1:
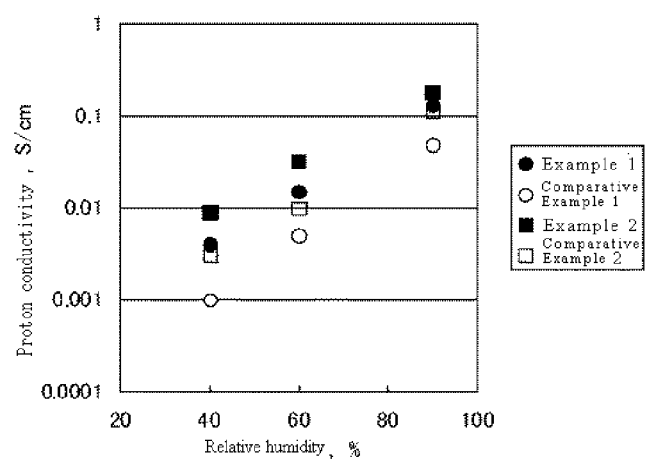
FIG. 1 shows the relative humidity dependence of proton conductivity at a measurement temperature of 50° C.

Firstly, the first aspect of the present invention will be explained.

The hydrophilic segment of the sulfonated aromatic block copolymer according to the first aspect has an ion-exchange capacity $IEC_a$ of solely the hydrophilic segment at 3.6 mmol/g or more, preferably 3.7 mmol/g or more, and more preferably 3.8 mmol/g or more, as calculated from the following equation. It is undesirable that the ion-exchange capacity of the hydrophilic segment is lower than 3.6 mmol/g, because the proton conductivity is lowered.

$$IEC_a = \frac{IEC \times W}{W_a} \qquad\text{[Mathematical 3]}$$

wherein IEC is an ion-exchange capacity of the block copolymer, W is a weight of the block copolymer, and $W_a$ is a weight of the hydrophilic segment in the block copolymer.

The ion-exchange capacity of the aforementioned block copolymer is in the range of from 0.5 mmol/g to 3.0 mmol/g, preferably from 0.6 mmol/g to 2.9 mmol/g, and more preferably from 0.7 mmol/g to 2.8 mmol/g. It is undesirable that the ion-exchange capacity of the block copolymer is lower than 0.5 mmol/g, because the proton conductivity becomes poor. It is also undesirable that the ion-exchange capacity is higher than 3.0 mmol/g, because the block copolymer becomes water-soluble or the membrane strength on water-absorption becomes largely lowered.

In the first aspect, the hydrophobic segment is a polymer segment that has aromatic rings in its main chain considering heat-resistance, and may include a segment of polyimide, polyphenylene, polyphenyleneoxide, polyphenylenesulfide, polyphenylenesulfoxide, polysulfone, polyethersulfone, polyetherketone, and others. Among these, a segment of polyethersulfone and/or polyetherketone represented by the following formula (15) is preferable because the block copolymer can be synthesized easily. In particular, a segment that contains the structure represented by the following formula (1) is preferable. In view of cost, more preferable is a segment of the polyethersulfone that is given by selecting $SO_2$ for $D^1$ in the following formula (1):

[Formula 6]

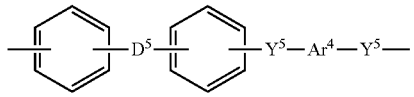

(15)

wherein, $D^5$ is CO or $SO_2$; $Y^5$ is O or S; and $Ar^4$ is a divalent aromatic residue.

[Formula 7]

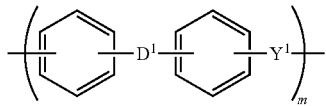

(1)

wherein $D^1$ is $SO_2$ or CO; $Y^1$ is O or S; and m is an integer of from 3 to 1,500.

In the first aspect, the hydrophilic segment is incorporated with sulfonic acid groups in view of heat-resistance and has aromatic rings in its main chain. Specifically there may be mentioned a segment of polyimde, polyphenylene, polyphenyleneoxide, polyphenylenesulfide, polyphenylenesulfoxide, polysulfone, polyethersulfone, polyetherketone and others in which sulfonic acid groups are incorporated. The sulfonic acid groups may be incorporated directly into the aromatic rings of the main chain or may be bonded to the main chain through a $C_{1-12}$ alkyl or fluoroalkyl group, a $C_{6-24}$ aromatic residue, or a $C_{1-12}$ alkoxy group. From the viewpoint of the ease of synthesis of the block copolymer, preferable is a segment of polyethersulfone and/or polyether ketone having the structural unit that is given by incorporating sulfonic acid groups into the structure represented by the following formula (2). More preferable is a segment of an aromatic polyethersulfone and/or polyetherketone that is composed of a structural unit [A] represented by the following formula (3) and a structural unit [B] represented by the following formula (4) and has a weight ratio [A]/[B] of from 10/0 to 1/9. In particular, in view of cost, preferable is a sulfonated polyethersulfone segment, which is given by selecting $SO_2$ for $D^3$ and $D^4$ and O for $Y^3$ and $Y^4$ in the following formulas (3) and (4).

[Formula 8]

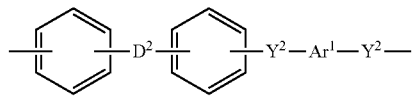

(2)

wherein $D^2$ is $SO_2$ or CO; $Y^2$ is O or S; and $Ar^1$ is a divalent aromatic residue.

[Formula 9]

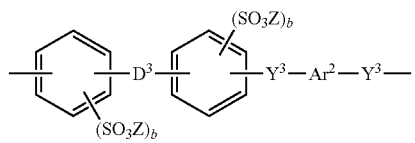

(3)

wherein $D^3$ is $SO_2$ or CO; b is an integer of 0 or 1, and at least either one of b is 1; Z is a hydrogen atom or an alkali metal; $Y^3$ is O or S; and $Ar^2$ is a divalent aromatic residue having sulfonic acid groups.

[Formula 10]

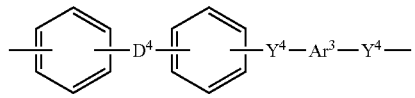

(4)

wherein $D^4$ is $SO_2$ or CO; $Y^4$ is O or S; and $Ar^3$ is a divalent aromatic residue having sulfonic acid groups.

There is not any particular limitation on the synthesis method of the sulfonated aromatic block copolymer used in the first aspect. For example, the copolymer can be synthesized by the following methods and the like:

(1) A method in which a hydrophobic segment prepolymer and a hydrophilic segment prepolymer that is not sulfonated or partly sulfonated each are preliminary synthesized; then an un-sulfonated block copolymer or a partly sulfonated block copolymer is obtained; and the block copolymer is sulfonated after only the hydrophilic segment is further added;

(2) A method in which a hydrophobic segment polymer and a sulfonated hydrophilic segment polymer each are preliminary synthesized; and then both are reacted to obtain the block copolymer.

The hydrophobic segment prepolymer, and the prepolymers of sulfonated hydrophilic segment, un-sulfonated hydrophilic segment and partly sulfonated segment (hereinafter, these are referred to as "hydrophilic segment prepolymer"), which are used for the synthesis of the aromatic block copolymer in the first aspect, can be synthesized by publicly-known methods as described, for example, in "Shin Kobunshi Jikkengaku 3, Kobunshi No Gosei•Hanno(2), Shukugokei Kobunshi No Gosei", edited by The Society of Polymer Science, Japan, published by Kyoritsu Shuppan Co., Ltd.; Tokyo, 1996.

The polyethersulfone and/or polyetherketone that are the hydrophobic segment prepolymer and hydrophilic segment polypolymer used for the synthesis of the preferable aromatic polyether block copolymer in the first aspect can be synthesized by reacting a di-alkali metal salt of a dihydric phenol compound and an aromatic dihalide compound as disclosed, for example, in "Shin Kobunshi Jikkengaku 3, Kobunshi No Gosei Hanno(2), Shukugokei Kobunshi No Gosei", edited by The Society of Polymer Science, Japan, published by Kyoritsu Shuppan Co., Ltd.; Tokyo, 1996; R. N. Johnson et al., J. Polym. Sci., A-1, Vol. 5, p. 2375 (1967); or Japanese Examined Patent Publication No. S46-21458.

The aromatic dihalide compound that is used for the synthesis of the preferable polyether block copolymer in the first aspect may include, for example, bis(4-chlorophenyl) sulfone, bis(4-fluorophenyl) sulfone, bis(4-bromophenyl) sulfone, bis(4-iodephenyl) sulfone, bis(2-chlorophenyl) sulfone, bis(2-fluorophenyl) sulfone, bis(2-methyl-4-chlorophenyl) sulfone, bis(4-chlorophenyl)ketone, bis(4-fluorophenyl)ketone, bis(4-bromophenyl)ketone, bis(4-iodephenyl)ketone, bis(2-chlorophenyl)ketone, bis(2-fluorophenyl)ketone, bis(2-methyl-4-chlorophenyl)ketone and the like. These may be used alone or in a combination of two or more kinds. Among these, there may be mentioned, preferably bis(4-chlorophenyl) sulfone, bis(4-fluorophenyl) sulfone, bis(4-chlorophenyl)ketone, and bis(4-fluorophenyl) ketone, and more preferably bis(4-chlorophenyl) sulfone and bis(4-fluorophenyl) sulfone. In addition, if necessary, 2,6-dichlorobenzonitrile and 2,6-difluorobenzonitrile may be used.

Further, besides the aforementioned aromatic dihalide compounds, as the sulfonated aromatic dihalide compounds that are used as a source material for forming the hydrophilic segment, there may be used a compound that is given by incorporating one or two sulfonic acid groups and/or their alkali metal salts into the aforementioned aromatic dihalide compounds. The compound may include, for example, 3,3'-disulfo-4,4'-dichlorodiphenylsulfone, 3,3'-disulfo-4,4'-difluorodiphenylsulfone, 3-sulfo-4,4'-dichlorodiphenylsulfone, 3-sulfo-4,4'-difluorodiphenylsulfone, 3,3'-disulfo-4,4'-dichlorodiphenylketone, 3,3'-disulfo-4,4'-difluorodiphenylketone, 3-sulfo-4,4'-dichlorodiphenylketone, 3-sulfo-4, 4'-difluorodiphenylketone and the like, and/or their alkali metal salts such as lithium, sodium and potassium salts. These compounds may be used alone or in a combination of two or more kinds. Among these, there may be mentioned, preferably 3,3'-disulfo-4,4'-dichlorodiphenylsulfone, 3,3'-disulfo-4,4'-difluorodiphenylsulfone, 3-sulfo-4,4'-dichlorodiphenylsulfone, 3-sulfo-4,4'-difluorodiphenylsulfone and the like, and/or their alkali metal salts such as lithium, sodium and potassium salts.

The dihydric phenol that is used for the synthesis of the preferable polyether block copolymer in the first aspect may include, for example, hydroquinone, resorcinol, 1,5-dihydroxynaphthalene, 1,6-dihydroxynaphthalene, 1,7-dihydroxynaphthalene, 2,6-dihydroxynaphthalene, 2,7-dihydroxynaphthalene, 4,4'-biphenol, 2,2'-biphenol, 2,4'-biphenol, bis(4-hydroxyphenyl)ether, bis(2-hydroxyphenyl) ether, 2,2-bis(4-hydroxyphenyl)propane, 2,2-bis(3-methyl-4-hydroxyphenyl)propane, 2,2-bis(3,5-dimethyl-4-hydroxyphenyl)propane, bis(4-hydroxyphenyl)methane, bis(4-hydroxyphenyl)sulfone, bis(4-hydroxyphenyl)sulfide, bis(4-hydroxyphenyl)ketone, 2,2-bis(3,5-dimethyl-4-hydroxyphenyl)hexafluoropropane, 9,9-bis(4-hydroxyphenyl)fluorene, 1,3-bis(4-hydroxyphenoxy) benzene, 1,4-bis(4-hydroxyphenoxy)benzene and the like. These may be used alone or in a combination of two or more kinds.

In the first aspect, when further sulfonation is carried out after the block copolymer is synthesized, in order to allow the sulfonation to proceed selectively, it is desirable that an electron-withdrawing group such as ketone or sulfone is bonded to each aromatic ring of the dihydric phenol used for the synthesis of the hydrophobic segment prepolymer so as to allow the dihydric phenol to have a structure not easily sulfonated. Such dihydric phenol may include preferably bis(4-hydroxyphenyl) sulfone and bis(4-hdyroxyphenyl)ketone among the aforementioned dihydric phenols.

On the other hand, when further sulfonation is carried out after the block copolymer is synthesized, in order to allow the sulfonation to proceed selectively, it is desirable that an electron-withdrawing group such as ketone or sulfone is not bonded to each aromatic ring of the dihydric phenol used for the synthesis of the hydrophilic segment prepolymer so as to allow the dihydric phenol to have a structure easily sulfonated. Such dihydric phenol may include preferably, for example, hydroquinone, resorcinol, 1,4-dihydroxynaphthalene, 1,5-dihydroxynaphthalene, 1,6-dihydroxynaphthalene, 1,7-dihydroxynaphthalene, 2,6-dihyroxynaphthalene, 2,7-dihydroxynaphthalene, 4,4'-biphenol, 2,2'-biphenol, bis(4-hydroxyphenyl)ether, bis(2-hydroxyphenyl)ether, 2,2-bis(4-hydroxyphenyl) propane, 2,2-bis(3-methyl-4-hydroxyphenyl)propane, 2,2-bis(3,5-dimethyl-4-hydroxyphenyl)propane, bis(4-hydroxyphenyl)methane, bis(4-hydroxyphenyl)sulfide, 2,2-bis(3,5-dimethyl-4-hydroxyphenyl) hexafluoropropane, 9,9-bis(4-hydroxyphenyl)fluorene among the aforementioned dihydric phenols and the like. From the viewpoint of reactivity, there may be mentioned preferably hydroquinone, resorcinol, 1,5-dihydroxynaphthalene, 2,7-dihydroxynaphthalene, 4,4'-biphenol, bis(4-hydroxyphenyl)ether, 2,2-bis(4-hydroxyphenyl)propane, 2,2-bis(3-methyl-4-hydroxyphenyl)propane, bis(4-hydroxyphenyl)methane, and 9,9-bis(4-hydroxyphenyl)fluorene.

When each segment prepolymer is synthesized, molecular weight may be modified and/or the terminal groups that are used for the synthesis of the block copolymer may be formed by using excessively either one of the aforementioned dihydric phenols or aromatic dihalide compounds. Alternatively, when the dihydric phenols and aromatic dihalides are used in equi-molar with each other, in order to modify the molecular weight and to form the terminal groups required for the synthesis of the block copolymer, may be added either one of a monohydric phenol such as phenol, cresol, 4-phenylphenol and 3-phenylphenol, and an aromatic halide such as 4-chlorophenylphenylsulfone, 1-chloro-4-nitrobenzene, 1-chloro-2-nitrobenzene, 1-chloro-3-nitrobenzene, 4-flulorobenzophenone, 1-fluoro-4-nitrobenzene, 1-fluoro-2-nitrobenzene and 1-fluoro-3-nitrobenzene.

The polymerization degree of each segment prepolymer is in the range of from 3 to 1,500, and preferably from 5 to 1,000. At a polymerization degree of lower than 3, the block copolymer synthesized using a prepolymer becomes difficult to exhibit adequate properties. On the other hand, when the polymerization degree exceeds 1,500, the block copolymer becomes difficult to synthesize.

In the first aspect, when further sulfonation is carried out after the block copolymer is synthesized, in order to sulfonate selectively only the hydrophilic segment, it is desirable that an electron-withdrawing group is bonded to the aromatic rings that form the hydrophobic segment. In this case, the most preferable hydrophobic segment prepolymer has a structure represented by the following formula (16):

[Formula 11]

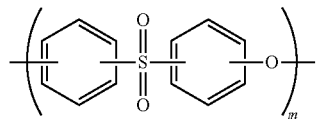

(16)

wherein, m is an integer of from 3 to 1,500.

As the hydrophobic segment prepolymer and un-sulfonated hydrophilic segment prepolymer, commercially available polymers having the adequate structures may be used. The commercially available polymers may be used after the molecular weight and the terminal groups are modified by ether-exchange reaction with the aforementioned dihydric alkali metal salt or a monohydric phenol describing below under similar conditions to the polyethersulfone synthesis as described in R. N. Johnson et al., J. Polym. Sci., A-1, Vol. 5, p. 2375 (1967) or Japanese Patent Application Publication No. S46-21458.

In the case of synthesizing the sulfonated aromatic polyether block copolymer used in the first aspect with the procedure in which un-sulfonated or partly sulfonated block copolymer is synthesized and then further sulfonated, the un-sulfonated or partly sulfonated block copolymer can be synthesized by reacting the aforementioned hydrophobic segment prepolymer that has halogen terminal groups or alkali metal salt terminal groups with the aforementioned hydrophilic segment prepolymer that has terminal groups corresponding to the terminal groups of the hydrophobic segment prepolymer, using the method as described in Z. Wu et al., Angew. Makromol. Chem., Vol. 173, p. 163 (1989); Z. Wu et al., Polym. Int., Vol. 50, p. 249 (2001); and others. In addition, both un-sulfonated and partly sulfonated block copolymers can be synthesized from the segment prepolymers that have phenol alkali-metal salt terminal groups using a linking agent in the same manner as mentioned above. As the linking agent, there may be mentioned the aromatic dihalides described above, preferably an aromatic dihalide that contains fluorine as halogen and has a high reactivity. Further, in the case of a polyethersulfone/polythioethersulfone block copolymer, the block copolymer can be also synthesized using the method disclosed in Japanese Patent Laid-Open Publication No. S61-168629. Still further, in the case of using the hydrophobic segment prepolymer represented by the above-mentioned formula (2), as disclosed in Japanese Patent Laid-Open Publication No. 2003-206354, the block copolymer can be synthesized by reacting the hydrophilic segment prepolymer that has phenol alkali-metal salt terminal groups with a commercially available hydrophobic segment prepolymer in a solution at a temperature of from 120° C. to 200° C.

The method of further sulfonating the un-sulfonated or partly sulfonated block copolymer has been known. The resulting un-sulfonated or partly sulfonated block copolymer is reacted, for example as described in Japanese Patent Laid-Open Publication No. S61-36781, Japanese Patent Application Publication No. H01-54323, Japanese Patent Application Publication No. H02-17571 and others, in a concentrated sulfuric acid of 95 wt % to 98 wt %, for 0.2 hour to 96 hours, at 10° C. to 80° C., so that only the hydrophilic segment is sulfonated, whereby the sulfonated aromatic block copolymer of the present invention can be obtained.

In the case of synthesizing the sulfonated aromatic ether block copolymer used in the first aspect from a sulfonated hydrophilic segment prepolymer and a hydrophobic segment prepolymer, the aforementioned un-sulfonated hydrophilic segment prepolymer may be reacted to synthesize the sulfonated aromatic polyester block copolymer with the hydrophilic segment using a sulfonated prepolymer in the same manner as used in the synthesis of the aforementioned un-sulfonated block copolymer.

The sulfonated aromatic block copolymer of the first aspect has a hydrophilic segment weight fraction $F_a$ as calculated from the following equation of preferably from 0.1 to 0.8, and more preferably from 0.2 to 0.7. The fraction smaller than 0.1 is undesirable, because the proton conductivity becomes lowered. The fraction larger than 0.8 is also undesirable, because the block copolymer becomes water-soluble.

$$F_a = \frac{W_a}{W_a + W_b}$$ [Mathematical 4]

wherein $F_a$ is hydrophilic segment weight fraction; $W_a$ is hydrophilic segment weight; and $W_b$ is hydrophobic segment weight.

In the first aspect, the polymer electrolyte of the aromatic block copolymer or a polymer electrolyte membrane obtained from the aromatic block copolymer has a proton conductivity at 50° C. and a relative humidity of 90% of preferably $1\times10^{-2}$ S/cm or more, and particularly preferably $1.5\times10^{-2}$ S/cm or more. It is undesirable that the proton conductivity is lower than $1\times10^{-2}$ S/cm, because power generation performance is lowered. Further, in the first aspect, the foregoing polymer electrolyte or membrane thereof has a proton conductivity at 50° C. and a relative humidity of 40% of preferably $4\times10^{-3}$ S/cm or more, more preferably $5\times10^{-3}$ S/cm or more, and particularly preferably $6\times10^{-3}$ S/cm or more. Still further, the foregoing polymer electrolyte or membrane thereof has a proton conductivity at 70° C. and a relative humidity of 30% of preferably $2\times10^{-3}$ S/cm or more, more preferably $2.5\times10^{-3}$ S/cm or more, and particularly preferably $3\times10^{-3}$ S/cm or more.

There is not any particular limitation on the method of forming the sulfonated aromatic block copolymer obtained as described above into the polymer electrolyte membrane of the first aspect. For example, the sulfonated aromatic block copolymer is dissolved in a solvent, and then the resulting solution is cast on a support and heated to remove the solvent by evaporation to obtain a membrane. The solvent is not required to be fully removed from the membrane on the support, but the membrane is peeled off from the support after a self-supporting membrane is formed, and then the solvent may be removed by heating.

For example, the preferred sulfonated aromatic polyether block copolymer in the first aspect is dissolved in a polar solvent such as dimethylsulfoxide, sulfolane, N-methyl-2-pyrolidone, 1,3-dimethyl-2-imidazolidinone, N,N-dimethylformamide, N,N-dimethylacetoamide and diphenylsulfone; after the resulting solution is cast on a support, the solution is dried at 80° C. to 250° C. for 0.5 minute to 48 hours to remove the polar solvent by evaporation, whereby a membrane can be obtained. Alternatively, when a self-supporting membrane is developed, the membrane may be peeled off and further dried at 80° C. to 250° C. for 0.5 minute to 48 hours to remove the polar solvent by evaporation. The drying temperature lower than 80° C. is undesirable, because the membrane is not fully dried. Above 250° C. is also undesirable, because the membrane is possibly decomposed.

The polymer electrolyte membrane of the first aspect has a thickness of from 5 μm to 200 μm, and preferably from 10 μm to 150 μm. The thickness less than 5 μm is undesirable, because the membrane becomes difficult to handle. The thickness more than 200 μm is also undesirable, because the power generation efficiency of fuel cells lowers.

A phase separation structure is found in the polymer electrolyte membrane of the first aspect when the cross-section thereof is observed with a transmission electron microscope at a magnification of 90,000 times, wherein the phase separation structure has an average distance between domains or lamellas of from 5 nm to 900 nm, and preferably from 10 nm to 800 nm. The polymer electrolyte of the first aspect exhibits an excellent proton conductivity at low humidity. This is possibly because proton conduction paths arising from the hydrophilic segment are formed by the phase separation structure, and sulfonic acid groups are present at a high density in the area where the hydrophilic segment forms.

The polymer electrolyte membrane of the first aspect, if necessary, may be allowed to have sulfonic acid groups that are partly converted to metal salts as long as the properties of the first aspect are not impaired. Further, the polymer electrolyte membrane may be reinforced with fibers, porous membranes, and others. Still further, if necessary, can be blended an inorganic acid such as phosphoric acid, hypophosphorous acid and sulfuric acid, or their salts, $C_{1-14}$ perfluoroalkylsulfonic acids or their salts, $C_{1-14}$ perfluoroalkylcarboxylic acids or their salts, an inorganic material such as platinum, silica gel, silica and zeolite, and the other polymers.

There is not any particular limitation on the production method of a fuel cell using the polymer electrolyte membrane of the first aspect. The fuel cell may be produced by known methods in the art, namely, the fuel cell is produced by bonding a catalyst and a conductive material that serves as a current collector on both sides of the polymer electrolyte membrane of the aromatic block copolymer. The aromatic block copolymer of the first aspect can be also used as an ion conductive component for a catalyst layer. That is, the aromatic block copolymer of the first aspect can be used not only as the electrolyte membrane of a polymer electrolyte membrane/electrode assembly used for a fuel cell, but also as an ion conductive component for the catalyst layer. The aromatic block copolymer can be used for both membrane and catalyst layer and provide a membrane/electrode assembly.

There is not any particular limitation on the catalyst, but can be used a publicly-known catalyst as long as the catalyst can activate the redox reaction of hydrogen or oxygen. For example, fine particles of platinum or platinum alloys can be used. The platinum fine particles are supported on granular or fibrous carbon such as active carbon and graphite.

As the conductive material serving as a current collector, can be also used a publicly-known material. For example, a porous woven fabric of carbon, a nonwoven fabric of carbon and a carbon paper are preferable, because source gases can be transported efficiently to the catalyst.

As the method of bonding the platinum fine particles or the carbon material loaded with platinum fine particles to the porous nonwoven fabric of carbon or carbon paper, and also the method of bonding the resulting catalyst layer to a polymer electrolyte film, can be used publicly-known methods that are described, for example, in J. Electrochem. Soc.: Electrochemical Science and Technology, Vol. 13105, No. 9, p. 2209 (1988) and the like.

Thus produced fuel cell of the first aspect can be used in a variety of configurations using as a fuel, hydrogen gas, reformed hydrogen gas, alcohol, ether or the like.

Next, the second aspect of the present invention will be explained.

The sulfonated block copolymer (A) used in the second aspect is composed of a hydrophilic segment having sulfonic acid groups and a hydrophobic segment having no sulfonic acid groups, both segments each having aromatic rings in its main chain. Both segments contain as a component, for example, an aromatic polymer structure including a polyimide; an aromatic polyether such as polyethersulfone, polysulfone, polyetherketone, polyetheretherketone, polyetherketoneketone and polyphenyleneoxide; a polyarylene; a polysulfide such as polyphenylenesulfide; and a polyazole such as polybenzimidazole, polybenzoxazole and polybenzthiazole. The component that forms the hydrophilic segment and hydrophobic segment may be the same or different. Further, each segment can be composed of two or more kinds of components. The sulfonic acid groups of the hydrophilic segment may be directly incorporated into the aromatic rings of the main chain, or bonded to the main chain through a $C_{1-12}$ alkyl or fluoroalkyl group, a $C_{6-24}$ aromatic residue, a $C_{1-12}$ alkoxy group, and others. The sulfonated block copolymer has an ion-exchange capacity of preferably from 0.6 mmol/g to 3.0 mmol/g, more preferably from 0.8 mmol/g to 2.8 mmol/g, still more preferably from 1.0 mmol/g to 2.7 mmol/g, and particularly preferably from 1.2 mmol/g to 2.6 mmol/g. In order to attain a high proton conductivity at low humidity, the sulfonated block copolymer particularly preferably has such characteristics that the hydrophilic segment of the sulfonated block copolymer has an ion-exchange capacity $IEC_W$ of 3.6 mmol/g or more and the sulfonated block copolymer has an ion-exchange capacity IEC of from 0.6 mmol/g to 3.0 mmol/g. It is undesirable that the ion-exchange capacity of the sulfonated block copolymer is lower than 0.6 mmol/g, because the proton conductivity is lowered. It is also undesirable that the ion-exchange capacity is larger than 3.0 mmol/g, because the sulfonated block copolymer becomes water-soluble.

$$IEC_w = \frac{IEC \times W}{W_w} \qquad \text{[Mathematical 5]}$$

wherein $IEC_W$ is an ion-exchange capacity of the sulfonated block copolymer; W is a weight of the sulfonated block copolymer; and $W_W$ is a weight of the hydrophilic segment in the sulfonated block copolymer.

Among the aforementioned structures, the sulfonated block copolymer whose both segments are selected from an aromatic polyether, polyarylene and polysulfide is preferable in view of water-resistance, and in view of ease of synthesis more preferably both segments are an aromatic polyether.

In the second aspect, as the preferable hydrophilic segment of the aromatic polyether sulfonated block copolymer, there may be mentioned the same preferable hydrophilic segment as that exemplified in the aromatic block copolymer of the first aspect.

In the second aspect, as the preferable hydrophobic segment of the aromatic polyether sulfonated block copolymer, there may be mentioned the same preferable hydrophobic segment as that exemplified in the aromatic block copolymer of the first aspect.

There is not any particular limitation on the synthesis method of the sulfonated block copolymer used in the second aspect, but the block copolymer can be synthesized by the same method as the above-exemplified synthesis method of the aromatic block copolymer in the first aspect and the like.

The sulfonated block copolymer of the second aspect has a hydrophilic segment weight fraction of preferably from 0.1 to 0.8, and more preferably from 0.2 to 0.7 similar to that in the aromatic block copolymer of the first aspect. Still more preferably the fraction is in the range of from 0.3 to 0.6. The fraction of smaller than 0.1 is undesirable since the proton conductivity becomes lowered. On the other hand, the fraction of larger than 0.8 is undesirable since the block copolymer becomes water-soluble.

The reason why the composition of the second aspect exhibit an adequate proton conductivity at low humidity as well as adequate properties on water-absorption is that the non-sulfonated aromatic polymer has the same structural unit as the hydrophobic segment of the sulfonated block copolymer, and that an adequate miscibility and a desirable phase separation structure can be attained.

As the non-sulfonated aromatic polymer (B) used in the second aspect, there may be mentioned the same polymers that are exemplified as specific examples for both segments of the aforementioned sulfonated block copolymer. The polymer (B) does not contain sulfonic acid groups and contains the same structural unit as that contained in the hydrophobic segment of the sulfonated block copolymer. The polymer (B) may have a structure of homo-polymer, random copolymer, or block copolymer. In the case of a random or block copolymer, it is desirable that the same structural unit as that contained in the hydrophobic segment of the non-sulfonated aromatic polymer is contained in an amount of preferably 30 wt % or more, more preferably 35 wt % or more, and still more preferably 40 wt % or more. A block copolymer that has a segment having the same structure as that in the hydrophobic segment, or an aromatic polymer that has the same structure as that in the hydrophobic segment is preferable. For example, when a sulfonated block copolymer having the hydrophobic segment represented by the above-mentioned formula (1) is used, a block copolymer or a homo-polymer that has the segment represented by the same formula as formula (1) is preferably used. In the case of a block copolymer, as the structure of the other segments there may be used the structure that is exemplified as a specific example for both segments of the aforementioned sulfonated block copolymer. The kind of the segments may be one or two or more.

In the polymer electrolyte composition of the second aspect, the weight fraction $P_b$ of aromatic polymer (B) is in the range of from 0.03 to 0.4, preferably from 0.03 to 0.3, and more preferably from 0.05 to 0.25 as calculated from the following equation. It is undesirable that the weight fraction $P_b$ is lower than 0.03, because the properties on water-absorption become lowered. It is also undesirable that $P_b$ is larger than 0.4, because the proton conductivity at low humidity becomes lowered.

$$P_b = \frac{W_B}{W_A + W_B} \quad \text{[Mathematical 6]}$$

wherein $W_A$ is a weight of the sulfonated block copolymer (A); and $W_B$ is a weight of the aromatic polymer (B).

The non-sulfonated aromatic polymer used in the present invention desirably has such a molecular weight that the polymer can exhibit a film-forming ability by itself, from the viewpoint of improving the properties on water-absorption.

The polymer electrolyte composition of the second aspect has an ion-exchange capacity of preferably from 0.5 mmol/g to 2.9 mmol/g, and more preferably from 0.7 mmol/g to 2.5 mmol/g. It is undesirable that the ion-exchange capacity is smaller than 0.5 mmol/g, because the proton conductivity becomes lowered. It is also undesirable that the ion-exchange capacity is larger than 2.9 mmol/g, because the properties on water-absorption become lowered.

In the second aspect, the composition is prepared by the solution-blending process in which a solvent capable of dissolving both the sulfonated block copolymer and non-sulfonated aromatic polymer is used. There is not any particular limitation on the solvent as long as the solvent can dissolve both components. As the solvent, there may be mentioned, for example, a polar solvent such as dimethylsulfoxide, sulfolane, N-methyl-2-pyrolidone, 1,3-dimethyl-2-imidazolidinone, N,N-dimethylformamide, N,N-dimethylacetoamide, diphenylsulfone, phenol, m-cresol and p-chlorophenol, and a halogenated solvent such as dichloromethane, 1,2-dichloroethane and chloroform. Blending can be carried out by dissolving uniformly in a solvent both components in solid state in predetermined amounts, or by mixing the non-sulfonated aromatic polymer with a solution of the sulfonated block copolymer obtained after the synthesis thereof.

Further, in the case where an electron-withdrawing group such as ketone, sulfone, nitro, cycano and trifluoromethyl, or a halogen such as chlorine, fluorine and bromine is bonded to substantially almost all of the aromatic rings of the non-sulfonated aromatic polymer, the composition may be prepared by dissolving both components together in concentrated sulfuric acid in the sulfonation process of the aforementioned un-sulfonated or partly sulfonated block copolymer. Still further, the composition may be prepared by dissolving both components in the prepared solution of the un-sulfonated or partly sulfonated block copolymer.

The sulfonated block copolymer used for these blending processes may have sulfonic acid groups that are not only in an acid form but also in a salt form with an organic base such as an aliphatic amine including ammonia, triethylamine, tripropylamine and tributylamine and a heterocyclic ring-containing base including imidazole, pyridine, quinoline or the like, or an alkali metal such as potassium, sodium and lithium.

The polymer electrolyte membrane of the second aspect is obtained by casting a solution of the polymer electrolyte composition on a support, heating and evaporating the solvent until a self-supporting membrane is formed; then peeling off the resulting self-supporting membrane from the support, if necessary further heating the membrane. Thus obtained polymer electrolyte membrane may be used as it is, but it is desirable that the polymer electrolyte membrane is further treated with an acid aqueous solution depending on applications such as fuel cells. In addition, if necessary, before the treatment with acid aqueous solution the membrane may be treated with an alkali aqueous solution. Note that, in the case of the sulfonated block copolymer having polyimide structure, the treatment with the alkali aqueous solution is not desirable because the membrane is possibly hydrolyzed, so that the membrane is desirably treated only with the acid aqueous solution. In each treatment, the membrane may be immersed in each aqueous solution for from 0.05 minute to 600 minutes in batch-wise or continuously. Short immersion is undesirable, because the treatment becomes insufficient. Long immersion is also undesirable, because no further change in the effect can be expected. After each treatment, if necessary, water-washing process and/or drying process may be incorporated as, for example, (1) alkali treatment→(2)

water washing→(3) acid treatment→(4) water washing→(5) drying. Still further, if necessary, a process of treating with alcohols such as methanol, ethanol and propanol, or ketones such as acetone can be incorporated.

For the alkali treatment may be used an aqueous solution prepared by dissolving NaOH, KOH, sodium carbonate, potassium carbonate, sodium hydrogen carbonate and potassium hydrogen carbonate in water. For the acid treatment, an aqueous solution prepared by dissolving hydrochloric acid, sulfuric acid and phosphoric acid in water may be used. Each solution is used in the range of from 0.01 N to 0.5 N of concentration. When the concentration of the aqueous solution is lower than 0.01 N, the treatment becomes possibly insufficient. At a concentration of higher than 5 N, the handling of the aqueous solution may become undesirably difficult. Either aqueous solution treatment is carried out at a temperature of from 5° C. to 90° C. When the temperature is lower than 5° C., the treatment becomes possibly insufficient. At a temperature of higher than 90° C., the handling of the aqueous solution may become undesirably difficult. The water-washing process may employ either of immersion or shower washing, or both in combination. The water-washing process is carried out at the same temperature and time as those of the aforementioned alkali or acid treatment. There is not any particular limitation on the drying process, but, for example, water is evaporated at a temperature of from room temperature to 200° C.

The polymer electrolyte membrane of the second aspect has a thickness of from 5 to 200 μm, and preferably from 10 to 150 μm. At a thickness less than 5 μm, the membrane is not easy to handle. The membrane thicker than 200 μm provides a fuel cell with undesirably low power generation efficiency.

In the second aspect, at 70° C. and 30% RH, the ratio $C_2/C_1$ of the proton conductivity $C_1$ of the membrane that is composed of only the sulfonated block copolymer to the proton conductivity $C_2$ of the membrane that is composed of the composition is preferably 0.5 or more, and more preferably 0.6 or more. Further, the proton conductivity at 70° C. and 30% RH is preferably 1 mS/cm or more, and particularly preferably 2 mS/cm or more.

In the second aspect, at 23° C. in the water, the ratio $E_2/E_1$ (retention ratio) of the elasticity $E_1$ of the membrane that is composed of only the sulfonated block copolymer to the elasticity $E_2$ of the membrane that is composed of the composition is preferably 1.1 or more, and more preferably 1.2 or more. Still further, at 23° C. in the water, the ratio $S_2/S_1$ (retention ratio) of the breaking strength $S_1$ of the membrane that is composed of only the sulfonated block copolymer to the breaking strength $S_2$ of the membrane that is composed of the composition is preferably 1.0 or more, and more preferably 1.1 or more.

The polymer electrolyte composition or the polymer electrolyte membrane of the second aspect, if necessary, may be allowed to have sulfonic acid groups that are partly converted to alkali metal salts or the aforementioned organic base salts as long as the properties of the first aspect are not impaired. Further, the polymer electrolyte membrane may be reinforced with fibers, porous membranes, and others. Still further, if necessary, can be blended an inorganic acid such as phosphoric acid, hypophosphorous acid and sulfuric acid, or their salts, $C_{1-14}$ perfluoroalkylsulfonic acids or their salts, $C_{1-14}$ perfluoroalkylcarboxylic acids or their salts, an inorganic material such as platinum, silica gel, silica and zeolite, and the other polymers.

There is not any particular limitation on the production method of a fuel cell using the polymer electrolyte membrane of the second aspect, but there may be mentioned the same method as that of the production method of the fuel cell using the polymer electrolyte membrane of the first aspect.

Thus produced fuel cell of the second aspect can be used in a variety of configurations using as a fuel, hydrogen gas, reformed hydrogen gas, alcohol, ether or the like.

Next, the third aspect of the present invention will be explained. The production method of the sulfonated polyarylether block copolymer of the third aspect is suitably applied to the production of the aromatic block copolymer of the first aspect and the sulfonated block copolymer (A) of the second aspect.

The hydrophilic segment prepolymer used in the third aspect is synthesized by nucleophilic substitution reaction between an alkali metal salt such as sodium, potassium and lithium salt of an aromatic dihalide containing sulfonic acid group and a dihydric phenol compound. The aromatic dihalide containing sulfonic acid group used for the reaction may include, for example, 3,3'-disulfo-4,4'-dichlorodiphenylsulfone, 3,3'-disulfo-4,4'-difluorodiphenylsulfone, 3-sulfo-4,4'-dichlorodiphenylsulfone, 3-sulfo-4,4'-difluorodiphenylsulfone, 3,3'-disulfo-4,4'-dichlorodiphenylketone, 3,3'-disulfo-4,4'-difluorodiphenylketone, 3-sulfo-4,4'-dichlorodiphenylketone, 3-sulfo-4,4'-difluorodiphenylketone and the like. In view of reactivity, 3,3'-disulfo-4,4'-dichlorodiphenylsulfone, 3,3'-disulfo-4,4'-difluorodiphenylsulfone, 3-sulfo-4,4'-dichlorodiphenylsulfone, and 3-sulfo-4,4'-difluorodiphenylsulfone are preferable. Further, in view of cost, 3,3'-disulfo-4,4'-dichlorodiphenylsulfone and 3-sulfo-4,4'-dichlorodiphenylsulfone are the most preferable. These aromatic dihalide compounds containing sulfonic acid group may be used alone or in a combination of two or more kinds. As an alkali metal that forms a salt with the sulfonic acid groups, there may be mentioned the above described ones. Among them, potassium is the most preferable, because the resulting potassium salt can be used as it is without further substitution.

In the third aspect, the dihydric phenol that is used for the synthesis of the hydrophilic segment prepolymer may include, for example, hydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, 2,2'-biphenol, 2,4'-biphenol, bis(4-hydroxyphenyl)ether, bis (2-hydroxyphenyl)ether, 2,2-bis(4-hydroxyphenyl)propane, 2,2-bis(3-methyl-4-hydroxyphenyl)propane, 2,2-bis(3,5-dimethyl-4-hydroxyphenyl)propane, bis(4-hydroxyphenyl) methane, bis(4-hydroxyphenyl)sulfone, bis(4-hydroxyphenyl) sulfide, bis(4-hydroxyphenyl) ketone, 2,2-bis(3,5-dimethyl-4-hydroxyphenyl) hexafluoropropane, 9,9-bis(4-hydroxyphenyl) fluorene, 1,3-bis(4-hydroxyphenoxy) benzene, 1,4-bis(4-hydroxyphenoxy)benzene and the like. A dihydric phenol having no electron-withdrawing groups such as sulfone or ketone bonded to the aromatic rings is preferable, because the dihydric phenol is capable of being sulfonated after the synthetic reaction of the block copolymer describing below and after the synthesis of the block copolymer. Such a compound may include, for example, hydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, 2,2'-biphenol, 2,4'-biphenol, bis(4-hydroxyphenyl)ether, bis(2-hydroxyphenyl) ether, 2,2-bis(4-hydroxyphenyl)propane, 2,2-bis(3-methyl-4-hydroxyphenyl)propane, 2,2-bis(3,5-dimethyl-4-hydroxyphenyl)propane, bis(4-hydroxyphenyl)methane, 9,9-bis(4-hydroxyphenyl)fluorene, 1,3-bis(4-hydroxyphenoxy)benzene, 1,4-bis(4-hydroxyphenoxy)benzene and the like. These dihydric phenols may be used alone or in a combination of two or more kinds.

In the third aspect, besides the aromatic dihalide compound containing sulfonic acid group, an aromatic dihalide compound having no sulfonic acid groups can be used. There may be mentioned, for example, bis(4-chlorophenyl)sulfone, bis(4-fluorophenyl)sulfone, bis(4-bromophenyl)sulfone, bis(4-iodephenyl)sulfone, bis(2-chlorophenyl)sulfone, bis(2-fluorophenyl)sulfone, bis(2-methyl-4-chlorophenyl)sulfone, bis(4-chlorophenyl)ketone, bis(4-fluorophenyl)ketone, bis(4-bromophenyl)ketone, bis(4-iodephenyl)ketone, bis(2-chlorophenyl)ketone, bis(2-fluorophenyl)ketone, bis(2-methyl-4-chlorophenyl)ketone, and others. These may be used alone or in a combination of two or more kinds. Among these, preferable are bis(4-chlorophenyl)sulfone, bis(4-fluorophenyl)sulfone, bis(4-chlorophenyl) ketone, and bis(4-fluorophenyl)ketone. Particularly preferable are bis(4-chlorophenyl)sulfone and bis(4-fluorophenyl)sulfone. In addition, if necessary, 2,6-dichlorobenzonitrile and 2,6-difluorobenzonitrile may be used. These aromatic dihalide compounds having no sulfonic acid groups and the aforementioned aromatic dihalide compounds containing sulfonic acid group are used in a molar ratio of preferably from 0:10 to 9:1, more preferably from 0:10 to 8:2, still more preferably from 0:10 to 7:3, and the most preferably from 0:10 to 6:4. It is not desirable that the aromatic dihalide compound containing sulfonic acid group is less than 1, because the proton conductivity becomes lowered.

In the case where the sulfonic acid groups are incorporated by sulfonation after the prepolymer is synthesized, the aromatic dihalide compound containing sulfonic acid group is not required to be used. The prepolymer can be also synthesized from the aforementioned aromatic dihalide compound having no sulfonic acid groups and a dihydric phenol having no electron-withdrawing group bonded to the aromatic ring.

In the third aspect, the hydrophilic segment prepolymer can be synthesized by the method that is used for synthesizing polyarylether through known nucleophilic substitution reaction. For example, as disclosed in "Shin Kobunshi Jikkengaku 3, Kobunshi No Gosei•Hanno (2), Shukugokei Kobunshi No Gosei", edited by The Society of Polymer Science, Japan, published by Kyoritsu Shuppan Co., Ltd., Tokyo, 1996; R. N. Johnson et al., J. Polym. Sci., A-1, Vol. 5, p. 2375 (1967); and Japanese Patent Application Publication No. S46-21458, the hydrophilic segment prepolymer can be synthesized by reacting a di-alkali metal salt of a dihydric phenol and the aforementioned aromatic dihalide compound. For example, (1) the aromatic dihalide compound, a dihydric phenol, and an alkali metal carbonate are mixed with a hydrocarbon solvent so as to azeotropically remove the generating water and a synthesis solvent;

(2) the resulting reaction mixture is heated while stirring so as to remove the generating water while the hydrocarbon solvent is refluxed; and (3) after the generating water is removed, while or after the hydrocarbon solvent is removed, the reaction mixture is further heated and stirred so as to obtain the hydrophilic segment prepolymer. In the above procedure, the step (2) of refluxing the hydrocarbon solvent is carried out at a temperature of from 100° C. to 170° C. and for from 1 hour to 48 hours. The step (3) of further stirring and heating is carried out at a temperature of from 140° C. to 220° C. for from 0.5 hour to 72 hours. The concentration of the resulting prepolymer in the synthesis solvent is preferably from 0.05 to 0.4 in terms of the weight of the resulting prepolymer with respect to the total weight of the prepolymer and synthesis solvent set equal to 1, more preferably from 0.07 to 0.35, particularly preferably from 0.08 to 0.32, and the most preferably from 0.1 to 0.3. It is undesirable that the weight of the resulting prepolymer is smaller than 0.05, because a large amount of the solvent is required. It is also undesirable that the weight is larger than 0.4, because the objective reaction is not easy to proceed.

In the third aspect, as the alkali metal carbonate that is used to change the hydroxyl group of the dihydric phenol into an alkali metal salt, there may be mentioned potassium carbonate, sodium carbonate, lithium carbonate or the like. Potassium carbonate is preferable, because the resulting potassium salt can be used as it is without further substitution. The charged amounts of the dihydric phenol and aromatic dihalide compound are required to be adjusted, so as to allow the following block copolymerization to proceed, in such a manner that terminal hydroxyl groups are formed. The molar ratio of the dihydric phenol to aromatic dihalide compound is in the range of preferably from 1.07:1 to 1.001:1, more preferably from 1.05:1 to 1.0015:1, and particularly preferably from 1.03:1 to 1.002:1. It is undesirable that the ratio of the dihydric phenol to the aromatic dihalide compound becomes larger than 1.07, because the mechanical strength of the final product block copolymer becomes lowered. It is also undesirable that the ratio becomes smaller than 1.001, because the block copolymerization becomes difficult to proceed.

In the third aspect, the solvent used for the synthesis has a capability of dissolving the resulting prepolymer and may include, for example, a polar solvent such as dimethylsulfoxide, sulfolane, N-methyl-2-pyrolidone, 1,3-dimethyl-2-imidazolidinone, N,N-dimethylformamide, N,N-dimethylacetoamide and diphenylsulfone. Further, as the hydrocarbon solvent that is admixed so as to azeotropically remove the generating water, there may be mentioned, for example, an aromatic hydrocarbon solvent such as benzene, toluene and xylene, and an aliphatic hydrocarbon solvent such as hexane, cyclohexane, octane, nonane and decane.

In the case where a unsulfonated prepolymer of the hydrophilic segment prepolymer is synthesized from an aromatic dihalide compound that has no sulfonic acid groups and a dihydric phenol, the hydrophilic segment prepolymer can be obtained by sulfonation describing below. In this case, the sulfonic acid groups of the resulting sulfonated hydrophilic segment prepolymer are required to be converted to potassium salt form after the prepolymer is separated from sulfuric acid solution. There is not any particular limitation on the conversion method, but the conversion can be completed by immersing the separated sulfonated prepolymer in a potassium hydroxide or potassium carbonate aqueous solution from 0.1 wt % to 20 wt % at from 10° C. to 80° C. for from 0.5 minute to 48 hours.

The hydrophilic segment prepolymer of the third aspect is composed of a structure represented by the following formula (17) in which the sulfonic acid groups are directly bonded to the aromatic rings.

[Formula 12]

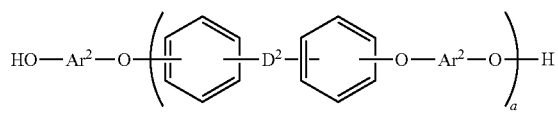

(17)

wherein $D^2$ is $SO_2$ or CO; $Ar^2$ is a divalent aromatic residue; and a is an integer of from 20 to 1,000.

More preferably, the hydrophilic segment prepolymer of the third aspect has a structure represented by the following formula (18). Particularly preferably, the structure is polyarylethersulfone that is given by selecting SO₂ for D².

[Formula 13]

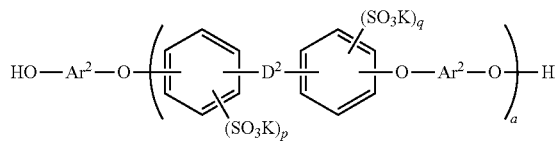

(18)

wherein, $D^2$ is $SO_2$ or CO; $Ar_2$ is a divalent aromatic residue; a is an integer of from 20 to 1,000; p and q each are independently an integer of 0, 1, or 2; and $p+q\geq 1$.

In the third aspect, the hydrophilic segment prepolymer whose sulfonic acid groups are in the form of potassium salt, has a solution viscosity (reduced viscosity) of preferably from 0.3 dl/g to 2.5 dl/g, more preferably from 0.35 dl/g to 2.3 dl/g, and particularly preferably from 0.4 dl/g to 2.0 dl/g at a concentration of 0.5 g/dl and at 25° C. It is undesirable that the solution viscosity is smaller than 0.3 dl/g, because the properties of the resulting block copolymer become lowered. It is also undesirable that the solution viscosity is larger than 2.5 dl/g, because the following block copolymerization becomes possibly difficult.

The hydrophobic segment prepolymer used in the third aspect can be synthesized by the same method as the method of the aforementioned hydrophilic segment prepolymer. As the dihydric phenol and aromatic dihalide compound that are used for the synthesis of the hydrophobic segment prepolymer, there may be mentioned specifically the dihydric phenols described above and the aromatic dihalide compounds that contain no sulfonic acid groups. There is not any particular limitation on the dihydric phenol that is used for the hydrophobic segment synthesis as long as the resulting block copolymer is not further sulfonated after it is synthesized. However, it is desirable that all of the aromatic rings of the dihydric phenol are bonded to electron-withdrawing groups, considering the ease of block copolymer synthesis or considering possible sulfonation of the hydrophilic segment after the block copolymer is synthesized. Such a dihydric phenol may include bis(4-hydroxyphenyl)sulfone and bis(4-hydroxyphenyl)ketone. As the aromatic dihalide compound, there may be mentioned bis(4-chlorophenyl)sulfone and bis(4-fluorophenyl)sulfone, considering the ease of the prepolymer synthesis. The molar ratio of the dihydric phenol to aromatic dihalide compound is in the range of preferably from 1.05:1 to 1:1.05, more preferably from 1.04:1 to 1:1.04, and particularly preferably from 1.03:1 to 1:1.03. It is undesirable that the ratio of the dihydric phenol to aromatic dihalide compound is out of the range of from 1.05:1 to 1:1.05, because the strength of the resulting electrolyte membrane becomes lowered. Note that, there is not any particular limitation of the terminal group structure of the hydrophobic segment, because the block copolymerization is carried out through ether exchange reaction using the hydrophilic segment prepolymer that has terminal hydroxyl groups. In this way, as the hydrophobic segment prepolymer, a commercially available polymer can be also used. For example, a commercially available polyethersulfone composed of the structural unit represented by the following formula (19) can be used.

[Formula 14]

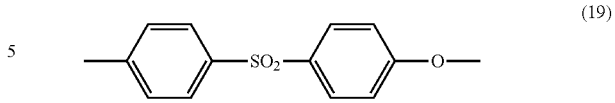

(19)

In the third aspect, the hydrophobic segment prepolymer has a solution viscosity (reduced viscosity) of preferably from 0.3 dl/g to 2.5 dl/g, more preferably from 0.35 dl/g to 2.3 dl/g, and particularly preferably from 0.4 dl/g to 2.0 dl/g at a concentration of 0.5 g/dl and at a temperature of 25° C. It is undesirable that the solution viscosity is smaller than 0.3 dl/g, because the properties of the resulting block copolymer become lowered. It is also undesirable that the solution viscosity is larger than 2.5 dl/g, because the following block copolymerization becomes possibly difficult.

In the third aspect, the hydrophilic segment prepolymer and hydrophobic segment prepolymer can be block copolymerized by using the method described in Japanese Patent Laid-Open Publication No. 2003-206354. For example, the hydrophilic segment prepolymer whose sulfonic acid groups and terminal hydroxyl groups are in the form of potassium salt and the hydrophobic segment prepolymer can be mixed and reacted in a solution at a temperature of from 120° C. to 200° C., preferably from 130° C. to 195° C., and more preferably from 140° C. to 190° C. It is undesirable that the temperature is lower than 120° C., because the reaction becomes difficult to proceed. It is also undesirable that the temperature is higher than 200° C., because the ether exchange reaction progresses too much and a random copolymer forms. The reaction time is in the range of from 15 minutes to 48 hours. It is undesirable that the reaction time is shorter than 15 minutes, because the reaction becomes insufficient. It is also undesirable that the reaction time becomes longer than 48 hours, because the ether exchange reaction progresses too much and a random copolymer forms.

In the block copolymer synthesis, the solutions of both components may be mixed without further treatments after the solutions are synthesized. Further, both or either component may be used after it is separated and dissolved in a solvent again. Still further, one component in a solid form may be dissolved in the solution of the other component.

Note that, in the case where the separated hydrophilic segment prepolymer is dissolved again, the hydroxyl groups are required to be converted into potassium salt form. This conversion can be completed by heating the prepolymer with potassium carbonate in the synthesis solvent and hydrocarbon solvent that are used in the prepolymer synthesis; and removing the generating water. The resulting solution can be used for the block copolymerization without further treatment. In the case where the sulfonic acid groups are in the form of sodium salt, the hydrophilic segment prepolymer can be used for the block copolymerization after the sulfonic acid groups of the prepolymer are converted to potassium salt form. For example, the hydrophilic segment prepolymer in the form of sodium salt is immersed in a hydrochloric acid or sulfuric acid aqueous solution so as to convert the sulfonic acid groups into an acid form, and then the prepolymer is immersed in a potassium hydroxide aqueous solution 0.1 wt % to 20 wt % at 10° C. to 80° C. for 0.5 minute to 48 hours so as to complete the conversion. From the hydrophilic segment prepolymer that is converted to potassium salt form in this way, a solution used for the block copolymerization can be prepared in the same process as that used in the aforementioned conversion of the hydroxyl group into potassium salt form.

In the third aspect, the solvent used for the block copolymer synthesis has a capability of dissolving both components, and may include, for example, a polar solvent such as dimethylsulfoxide, sulfolane, N-methyl-2-pyrolidone, 1,3-dimethyl-2-imidazolidinone, N,N-dimethylformamide, N,N-dimethylacetoamide and diphenylsulfone, which is used as the synthesis solvent for both prepolymers. In addition, the hydrocarbon solvent used for the synthesis of both prepolymers may be included. The polymer concentration to the polar solvent in the block copolymerization is in the range of preferably from 0.05 to 0.4 with respect to the total of the prepolymers and polar solvent set equal to 1, more preferably from 0.07 to 0.35, particularly preferably from 0.08 to 0.3. It is undesirable that the concentration of the prepolymers is smaller than 0.05 and larger than 0.4, because the block copolymerization becomes difficult to proceed.

In the third aspect, the resulting sulfonated polyarylether block copolymer may be subjected to an additional sulfonation. The additional sulfonation can be completed by dissolving the sulfonated polyarylether block copolymer at a concentration of from 2 wt % to 30 wt %, preferably from 3 wt % to 25 wt %, and more preferably from 4 wt % to 20 wt % in a concentrated sulfuric acid from 80% to 98%, and reacting at a temperature of from 10° C. to 65° C. for 0.1 hour to 168 hours. Not that, in this case, in order to selectively additionally sulfonate the hydrophilic segment, it is required that no electron-withdrawing groups such as sulfone, ketone, nitrile and nitro groups are bonded to the aromatic rings of the hydrophilic segment, and that the aforementioned electron-withdrawing groups be bonded to almost all of the aromatic rings of the hydrophobic segment. It is undesirable that the concentration of the sulfonated polyarylether block copolymer is higher than 30 wt %, because the additional sulfonation becomes difficult. It is also undesirable, from the viewpoint of cost, that the concentration is lower than 2 wt %, because the effect on the sulfonation is not changed. It is undesirable that the concentration of the concentrated sulfuric acid is lower than 80%, because sulfonation sometimes does not proceed. It is also undesirable that the concentration is higher than 98%, because even the hydrophobic segment composed of aromatic rings having electron-withdrawing groups bonded thereto is possibly sulfonated.

The sulfonated polyarylether block copolymer synthesized by the production method according to the third aspect has a hydrophilic segment weight fraction of preferably from 0.1 to 0.8, more preferably from 0.2 to 0.7, and particularly preferably from 0.25 to 0.65. It is undesirable that the weight fraction is smaller than 0.1, because the proton conductivity becomes lowered. It is also undesirable that the weight fraction is larger than 0.8, because the block copolymer becomes water-soluble.

The sulfonated polyarylether block copolymer synthesized by the production method according to the third aspect has an ion-exchange capacity of preferably from 0.5 mmol/g to 3.0 mmol/g, more preferably from 0.6 mmol/g to 2.9 mmol/g, and still more preferably from 0.7 mmol/g to 2.8 mmol/g. It is undesirable that the ion-exchange capacity of the block copolymer is lower than 0.5 mmol/g, because the proton conductivity is lowered. It is also undesirable that the ion-exchange capacity is larger than 3.0 mmol/g, because the sulfonated block copolymer becomes water-soluble or the membrane strength on water absorption is largely lowered.

In the third aspect, there is not any particular limitation on the ion-exchange capacity of the hydrophilic segment of the sulfonated polyarylether block copolymer, but the ion-exchange capacity $IEC_a$ of the hydrophilic segment solely is preferably 3.6 mmol/g or more from the viewpoint of proton conductivity, more preferably 3.7 mmol/g or more, and particularly preferably 3.8 mmol/g or more.

In the third aspect, the sulfonated polyarylether block copolymer has a proton conductivity, at 70° C. and a relative humidity of 90%, of preferably $1 \times 10^{-2}$ S/cm or more, and particularly preferably $1.5 \times 10^{-2}$ S/cm or more. It is undesirable that the proton conductivity is lower than $1 \times 10^{-2}$ S/cm, because power generation performance is lowered. Further, at 70° C. and a relative humidity of 30%, the proton conductivity is preferably $1 \times 10^{-3}$ S/cm or more, more preferably $2.5 \times 10^{-3}$ S/cm or more, and particularly preferably $3.0 \times 10^{-3}$ S/cm or more. It is undesirable that the proton conductivity at 70° C. and a relative humidity of 30% is lower than $1 \times 10^{-3}$ S/cm, because power generation performance is lowered.

There is not any particular limitation on the method of forming the sulfonated polyarylether block copolymer obtained as described above into a polymer electrolyte membrane. For example, the sulfonated polyaryl block copolymer is dissolved in a solvent; the resulting solution is cast on a support and heated to remove the solvent by evaporation to obtain a membrane. The solvent is not required to be fully removed from the membrane on the support, but the membrane is peeled off from the support after a self-supporting membrane is formed, and then the solvent may be removed by heating. For example, the block copolymer is dissolved in a polar solvent such as dimethylsulfoxide, sulfolane, N-methyl-2-pyrolidone, 1,3-dimethyl-2-imidazolidinone, N,N-dimethylformamide, N,N-dimethylacetoamide and diphenylsulfone; after the resulting solution is cast on a support, the solution is dried at 80° C. to 250° C. for 0.5 minute to 48 hours to remove the polar solvent by evaporation, whereby a membrane can be obtained. Alternatively, when a self-supporting membrane is developed, the membrane may be peeled off and further dried at 80° C. to 250° C. for 0.5 minute to 48 hours to remove the polar solvent by evaporation. It is undesirable that the drying temperature is lower than 80° C., because the membrane is not fully dried. Above 250° C. is also undesirable, because the membrane is possibly decomposed.

The polymer electrolyte membrane has a thickness of from 5 to 200 μm, and preferably from 10 μm to 150 μm. The thickness less than 5 μm is undesirable, because the membrane becomes difficult to handle. The thickness more than 200 μm is also undesirable, because the power generation efficiency of fuel cells lowers.

The polymer electrolyte membrane, if necessary, may be allowed to have sulfonic acid groups that are partly converted to metal salts as long as the properties of the present invention are not impaired. Further, the polymer electrolyte membrane may be reinforced with fibers, porous membranes, and others. Still further, if necessary, can be blended an inorganic acid such as phosphoric acid, hypophosphorous acid and sulfuric acid, or their salts, $C_{1-14}$ perfluoroalkylsulfonic acids or their salts, $C_{1-14}$ perfluoroalkylcarboxylic acids or their salts, an inorganic material such as platinum, silica gel, silica and zeolite, and other polymers.

There is not any particular limitation on the production method of a fuel cell that uses the polymer electrolyte membrane, but there may be mentioned the same production method as that used to produce the fuel cell using the polymer electrolyte membrane of the first aspect.

Thus produced fuel cell can be used in a variety of configurations using as a fuel, hydrogen gas, reformed hydrogen gas, alcohol, ether, or the like.

Next, the forth aspect of the present invention will be explained. The production method of the polymer electrolyte membrane of the forth aspect is suitably applied to the production of the polymer electrolyte membranes of the first aspect and second aspect.

The phosphate ester used in the forth aspect is the phosphate ester represented by the following formula (11) and may include, for example, monocaproyl phosphate, monooctyl phosphate, monocapryl phosphate, monolauryl phosphate, monomyristyl phosphate, monoacetyl phosphate, monostearyl phosphate, tetraethyleneglycol mononeopentylether monophosphate, triethyleneglycol monotridecylether monophosphate, tetraethyleneglycol monolaurylether monophosphate, diethyleneglycol monostearylether monophosphate, dicaproyl phosphate, dioctyl phosphate, dicapryl phosphate, dilauryl phosphate, dimyristyl phosphate, dicetyl phosphate, distearyl phosphate, tetraethyleneglycol mononeopentylether diphosphate, triethyleneglycol monotridecylether diphosphate, tetraethyleneglycol monolaurylether diphosphate, diethyleneglycol monostearylether diphosphate and the like.

[Formula 15]

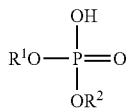
(11)

wherein $R^1$ is a hydrogen atom, an alkyl group having 6 to 18 carbon atoms, or a group represented by the following formula (13); and $R^2$ is an alkyl group having 6 to 18 carbon atoms or a group represented by the following formula (13),

[Formula 16]

(13)

wherein $R^3$ is an alkyl group having 5 to 18 carbon atoms; and m is an integer of from 2 to 30, The salt of amine and phosphate ester used in the forth aspect is the salt obtained from the foregoing phosphate ester and an amine represented by the following formula (12).

[Formula 17]

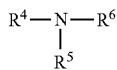
(12)

wherein $R_4$ to $R_6$ each are a hydrogen atom, a hydroxyethyl group, or an alkyl group having 1 to 12 carbon atoms.

The amine represented by the above formula (12) may include, for example, ammonia, monomethylamine, monoethylamine, monopropylamine, monobutylamine, monohexylamine, monooctylamine, monolaurylamine, dimethylamine, diethylamine, dipropylamine, dibutylamine, dihexylamine, dioctylamine, dilaurylamine, trimethylamine, triethylamine, tripropylamine, tributylamine, trihexylamine, trioctylamine, trilaurylamine, monoethanolamine, diethanolamine, triethanolamine and the like.

As the aforementioned alkylphosphate, a commercially available product may be used, which includes, for example, "SEPARL328", "SEPARL365", "SEPARL380", "SEPARL440", "SEPARL441", "SEPARL517", "SEPARL521" (trade name), manufactured by Chukyo Yushi Co., Ltd., and the like.

The phosphate ester and/or salt between phosphate ester and amine are/is admixed in an amount of from 0.0005 to 2 parts by weight, preferably from 0.001 to 2 parts by weight, more preferably from 0.002 to 1.5 parts by weight, and still more preferably from 0.003 to 1.0 part by weight with respect to 100 parts by weight of the polymer electrolyte. When the amount added is less than 0.0005 part by weight, no effect is obtained. On the other hand, when the amount added is more than 2 parts by weight, the effect is not changed.

The polymer electrolyte used in the forth aspect has strong acid groups such as sulfonic acid groups and phosphoric acid groups, or superstrong acid groups such as sulfonic acid groups bonded to fluoroalkyl or fluoroaryl groups, and may include an aliphatic hydrocarbon polymer, an aliphatic polymer whose hydrogen atoms are substituted for fluorine atoms, an aromatic polymer having aromatic rings in its main chain and the like.

These polymers may include, for example, a polymer having an aliphatic main chain such as polystyrene sulfonic acid; polyvinylbenzyl sulfonic acid; styrene-(ethylene-butylene)-styrene triblock copolymer or styrene-(ethylene-propylene) block copolymer that contains sulfonic acid groups as described in Japanese Patent Application Laid-Open No. 2002-509152 and European Polymer Journal, Vol. 36, p. 61 (2001); styrene-(ethylene-butylene)-styrene triblock copolymer or styrene-(ethylene-propylene) block copolymer that contains carboxylic acid groups as described in Macromolecules, Vol. 28, p. 8702 (1995) or European Polymer Journal, Vol. 36, p. 61 (2001); a polystyrene polymer having strong acid groups such as a polystyrene having phosphonic acid groups as described in Japanese Patent Laid-Open Publication No. 2000-11755; polyacrylic acid; polymethacrylic acid; a vinylpolymer having strong acid groups such as polyvinylsulfonic acid; and a perfluoro polymer having superstrong acid groups such as Nafion (registered trademark), Aciplex (registered trademark), and Flemion (registered trademark).

In addition, there may be mentioned an aromatic polymer electrolyte, including polyethersulfone, polysulfone, polyetherketone, polyetheretherketone, polyetherketoneketone, polyimide, polyphenyleneoxide, polyarylene, polyphenylenesulfide and the like that contain strong acid groups or superstrong acid groups. For example, there may be mentioned, an aromatic polyethersulfone that contains sulfonic acid groups as described in Japanese Patent Laid-Open Publication No. S61-43630; J. Membr. Sci., Vol. 83, p. 211 (1993); J. Polym. Sci., Part A, Polym. Chem., Vol. 34, p. 2421 (1996); J. Polym. Sci., Part A, Polym. Chem., Vol. 31, p. 853 (1993); U.S. Patent No. 2001/0021764A1; and Japanese Patent Laid-Open Publication No. 2003-31232; an aromatic polyetherketone that contains sulfonic acid groups as described in Japanese Patent Laid-Open Publication No. S57-25328; Japanese Patent Laid-Open Publication No. H06-93114; J. Membr. Sci., Vol. 199, p. 167 (2002); J. Membr. Sci., Vol. 173, p. 17 (2000); Polymer, Vol. 28, p. 1009 (1987); Solid State Ionics, Vol. 106, p. 219 (1998); Br. Polym. J., Vol. 17, p. 4 (1985); and Polym. Int., Vol. 50, p. 812 (2001); a polyimide that contains sulfonic acid groups as described in Polymer Preprint, Japan of The Society of Polymer Science, Japan, Vol. 51, p. 744-746 (2002); a polyphenyleneoxide that contains sulfonic acid groups as described in J. Appl. Polym. Sci., Vol. 51, p. 1399 (1994); J. Appl. Polym. Sci., Vol. 29, p. 4017 (1984); J. Appl. Polym. Sci., Vol. 29, p. 4029 (1984); and J. Membr. Sci., Vol. 146, p. 263 (1998); and a sulfonated polyarylene as described in Japanese Patent Laid-Open Publication No. 2005-112985.

These polymer electrolytes may be a copolymer, a random copolymer, a block copolymer, or a graft copolymer. In particular, from the viewpoint of proton conductivity, these polymer electrolytes desirably have a block copolymer structure. Among these polymer electrolytes, an aromatic polymer electrolyte is preferable from the viewpoint of heat-resistance and cost. Further, from the viewpoint of ion conductivity, an aromatic polymer electrolyte that contains sulfonic acid groups is preferable. Further, within the range of ion-exchange capacity describing below, there may be mentioned a polymer electrolyte composed of a polymer-blend composition that contains a polymer that has no strong acid groups or superstrong acid groups and the aforementioned polymer that has strong acid groups or superstrong acid groups. As the polymer having no strong acid groups or superstrong acid groups, there may be mentioned specifically, the aforementioned polymer having no strong acid groups or superstrong acid groups. A combination of a polymer that has strong acid groups or superstrong acid groups and a polymer that has no strong acid groups or superstrong acid groups and has the same structural unit as that of the former polymer is preferable.

These polymer electrolytes have an ion-exchange capacity of preferably from 0.2 mmol/g to 4 mmol/g, and more preferably from 0.3 mmol/g to 3.5 mmol/g. It is undesirable that the ion-exchange capacity is smaller than 0.2 mmol/g, because proton conductivity becomes lowered, for example, for fuel cell applications. It is also undesirable that the ion-exchange capacity is larger than 4 mmol/g, because the polymer electrolytes become water-soluble.

As the polymer electrolyte used in the fourth aspect, the polymer electrolyte of the first aspect or the polymer electrolyte composition of the second aspect is particularly preferable.

There is not any particular limitation on the solvent used in the forth aspect as long as the solvent can dissolve the objective polymer electrolyte, and phosphate ester or a salt of phosphate ester and amine. For example, in the case of aromatic polymer electrolytes, there may be mentioned a polar solvent such as dimethylsulfoxide, sulfolane, N-methyl-2-pyrolidone, 1,3-dimethyl-2-imidazolidinone, N,N-dimethylformamide, N,N-dimethylacetoamide, diphenylsulfone, phenol, m-cresol, and p-chlorophenol.

In the production method of the polymer electrolyte membrane according to the fourth aspect, when a polymer electrolyte solution is heated to evaporate the solvent until a self-supporting membrane is obtained after the polymer electrolyte solution is cast on a support, there is not any particular limitation on the drying condition as long as no foam develops. Generally, the solution is dried in the range of from room temperature to the temperature higher by 20° C. than the boiling point of the solvent, for 0.2 minute to 72 hours. In particular, vacuum drying or hot-air drying is desirable because drying speed can be enhanced. In addition, after the self-supporting membrane is peeled off from the support, if necessary, the membrane may be further dried at a temperature of from room temperature to 280° C. for 0.2 minute to 72 hours.

As the material for the support used in the fourth aspect, there may be mentioned rubber, plastics, metals such as stainless steel, ceramics, glass, and others. From the viewpoint of durability, metals such as stainless steel, ceramics, glass and others are preferable. The shape of the support may be a plate, a belt, a roll and the like. In particular, a belt or roll shaped support is desirable, because the membrane can be produced continuously.

In the forth aspect, a polymer electrolyte membrane is prepared as follows: a polymer electrolyte solution is cast on a support and heated to evaporate the solvent until a self-supporting membrane is formed; the resulting self-supporting membrane is peeled off from the support; and if necessary, the membrane is further dried. Thus prepared polymer electrolyte membrane may be used as it is, but the membrane is desirably subjected to an acid aqueous solution treatment depending on applications such as fuel cells. Further, if necessary, the membrane may be subjected to the acid aqueous solution treatment after the membrane is subjected to an alkali aqueous solution treatment. In each treatment, the membrane may be immersed in each aqueous solution for from 0.05 minute to 600 minutes in batch-wise or continuously. Short immersion is undesirable, because the treatment becomes insufficient. Long immersion is also undesirable, because no further change in the effect can be expected. For example, as described above, after each treatment, if necessary, water-washing process and/or drying process may be incorporated as follows: (1) alkali treatment→(2) water washing→(3) acid treatment→(4) water washing→(5) drying.

In the case where phosphate ester or the salt of phosphate ester and amine is used in an amount more than 0.5 wt %, it is desirable that the added phosphate ester or the salt of phosphate ester and amine is removed in the alkali aqueous solution treatment followed by the acid aqueous solution treatment. Eventually, the phosphate ester or the salt of phosphate ester and amine remained in the polymer electrolyte membrane is reduced below preferably 0.5 wt % or less, and more preferably 0.4 wt % or less. It is undesirable that the phosphate ester or the salt of phosphate ester and amine remains too much, because the durability or power generation performance is possibly lowered.

EXAMPLES

The present invention will be further described in detail with reference to the following examples and comparative examples. The measured values in the examples and comparative examples were obtained by the following methods.
1) Solution Viscosity η sp/c (Reduced Viscosity) Measurement A test specimen was dissolved in N-methyl-2-pyrolidone (containing 50 mmol/L of LiCl) in a solution with a concentration of 0.5 g/dl. The resulting solution was measured with an Ubbelode viscometer at 25° C., and the viscosity was calculated by the following equation (1):

[Mathematical 7]

$$\eta_{sp/c} = \frac{t_s - t_0}{t_0} \cdot \frac{1}{c} \quad (1)$$

wherein, $t_s$ is the time measured for the solution; $t_0$ is the time measured for the solvent; and c is the concentration of the solution.
2) Proton Conductivity Measurement In a thermo-hygrostat, a test specimen membrane (5 mm wide×20 mm long) was sandwiched between a Teflon (registered trademark) plate that had a slit of 1.9 mm wide and 10 mm long and platinum wires on both sides of the slit (at a spacing of 2 mm) and another Teflon (registered trademark) flat plate in such a manner that the longitudinal direction of the membrane was directed at an angle of 90 degree to the platinum wires. At a temperature of 50° C. or 70° C. with changing the relative humidity, the proton conductivity of the membrane was evaluated by the complex impedance measurement using LCR HiTESTER 3532 manufactured by HIOKI E. E. Corporation.

3) Ion-Exchange Capacity Measurement

A test specimen was put in a sodium hydroxide aqueous solution with a known concentration; after stirring at room temperature for 16 hours, the solution was filtered off; the resulting filtrate was titrated with a 0.01 N hydrochloric acid solution so as to measure the consumed amount of sodium hydroxide; and then the ion-exchange capacity was calculated.

4) Transmission Electron Microscope Observation

A thin test specimen was prepared by cutting the membrane in the thickness direction, and was observed with JEM-200CX manufactured by JEOL Ltd. at a magnification of 90,000.

5) H-NMR Measurement

AL-300 and EX-400WB manufactured by JEOD Ltd., and a d-DMSO as a solvent, were used for measurement.

6) Evaluation of Properties on Water-Absorption

A TENSILON tensile tester was used. The measurement conditions are as follows. Note that, the properties on water-absorption were measured by drawing a test specimen in water.

Test specimen size: 5 mm of width, 30 mm of length between chucks

Tensile speed: 30 mm/min

Test temperature: 23° C.

7) Evaluation of Peeling Properties

On a stainless steel plate (SUS304, 40 mm×150 mm), a sample solution was cast and dried under predetermined conditions. Peeling properties were evaluated by the condition of the resulting self-supporting film when it was peeled off from the stainless steel plate.

Synthesis Example 1

Synthesis of 3,3'-Disulfo-4,4'-Difluorodiphenylsulfone Sodium Salt

In a flask, 120 g of bis(4-fluorophenyl)sulfone and 250 g of 30% fuming sulfuric acid were charged and heated at 110° C. for 6 hours while stirring. After the resulting solution was gradually added to ice water, sodium chloride was added so as to deposit a solid product. The solid product was dissolved again in water. After the resulting solution was neutralized with NaOH, sodium chloride was added so as to deposit a solid product again. The solid product was recrystallized twice with a 2-propanol/water (7/3) mixture and dried to obtain a white solid product. Thus obtained white solid product provided H-NMR signals at from 7.4 ppm to 7.5 ppm, from 7.9 ppm to 8.0 ppm, and from 8.1 ppm to 8.2 ppm with the integrated intensities of 1:1:1. The white solid product was identified to be 3,3'-disulfo-4,4'-difluorodiphenylsulfone sodium salt.

Example 1

Polymerization of Polyethersulfone Block Copolymer PB1

In a four-necked flask equipped with a stirrer, a Dean-Stark trap, a thermometer, and a nitrogen gas inlet, 10.17 g of bis(4-fluorophenyl)sulfone, 27.5 g of 3,3'-disulfo-4,4'-difluorodiphenylsulfone sodium salt, 18.9 g of 4,4'-biphenol, and 17.5 g of potassium carbonate were charged; after 210 ml of dimethylsulfoxide and 50 ml of toluene were added, the reaction mixture was heated and stirred under nitrogen flow. The temperature was elevated to 175° C. while removing the generating water together with toluene, and then the reaction mixture was stirred at that temperature for 16 hours to obtain a hydrophilic prepolymer HP1 solution. Separately, 81.47 g of bis(4-fluorophenyl)sulfone, 78.99 g of bis(4-hydroxyphenyl) sulfone, and 52 g of potassium carbonate were charged; after 600 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to obtain a hydrophobic prepolymer SP1 solution. The SP1 solution was added to the HP1 solution, and then the mixed solution was stirred at 170° C. for 1.5 hours. The solution was poured into a large amount of water to deposit a white solid product, which was then filtered off. Thus obtained solid product was washed in hot water twice, and in methanol once, whereby a block copolymer PB1 was obtained. The solution viscosity η sp/c of the obtained polymer was 0.61 dl/g. The ion-exchange capacity was 0.59 mmol/g.

Sulfonation of Block Copolymer PB1 (SPB1 Synthesis)

20 g of the block copolymer PB1 were dissolved in 180 g of 98% sulfuric acid, and the resulting solution was stirred at room temperature for 24 hours. The solution was poured into a large amount of water to deposit a white solid product, which was then filtered off. Thus obtained solid was washed in water 5 times to obtain a polymer SPB1. The ion-exchange capacity of the polymer was 1.46 mmol/g. The hydrophilic segment, which is water-soluble when it acts solely, is removed by water washing after sulfonation if the product is a blend as mentioned in Referenced Example 2, and the ion-exchange capacity is largely lowered. However, the ion-exchange capacity of SPB1 gave almost the same value as the calculated value, 1.49 mmol/g obtained by assuming that one sulfonic acid group was incorporated into each of the biphenol residue aromatic rings of PB1 before sulfonation. This shows that the hydrophilic segment and hydrophobic segment are bonded together. In addition, in the membrane prepared by the method described below, a phase-separation structure having an average domain distance of 60 nm was found by TEM observation. Hence, SPB1 was identified to be a block copolymer. The hydrophobic segment is not sulfonated under the foregoing sulfonation conditions. Therefore, only the hydrophilic segment is considered to have sulfonic acid groups. Based on the SPB1 composition obtained by the H-NMR measurement, the hydrophilic segment weight fraction after the sulfonic acid groups were converted to $SO_3H$ was 0.31. The ion-exchange capacity of the hydrophilic segment of SPB1 was 4.73 mmol/g.

SPB1 was dissolved in N,N-dimethylacetoamide to obtain a 20 wt % solution, which was then cast on a glass plate and dried at 130° C. for 1 hour. After the resulting self-supporting membrane was peeled off from the glass plate and fixed on a metal frame, the membrane was further dried with hot air at 200° C. for 0.5 hour to obtain a 50 nm thick membrane. The resulting membrane was immersed in a 1 N sodium hydroxide aqueous solution at room temperature for 2 hours, water-washed, and then immersed in a 1 N sulfuric acid aqueous solution for 4 hours. The membrane was water-washed 3 times. After the washing water was confirmed to be neutral, the proton conductivity was measured at 50° C. and 70° C. with changing the relative humidity. The results are shown in Table 1 and FIG. 1. As compared with Comparative Example 1 described below, the proton conductivity was remarkably improved even at the same ion-exchange capacity.

Example 2

Preparation of Polyethersulfone Block Copolymer PB2

In a four-necked flask equipped with a stirrer, a Dean-Stark trap, a thermometer, and a nitrogen gas inlet, 12.71 g of bis(4-fluorophenyl)sulfone, 22.91 g of 3,3'-disulfo-4,4'-difluorodiphenylsulfone sodium salt, 18.9 g of 4,4'-biphenol, and 17 g of potassium carbonate were charged; after 200 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to obtain a hydrophilic prepolymer HP2 solution. Separately, 100 g of "SUMIKAEXCEL 7600P" (manufactured by Sumitomo Chemical Co., Ltd.) having the repeating unit represented by the following formula,

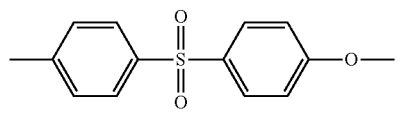

[Formula 18]

were dissolved in 310 ml of dimethylsulfoxide; and then 50 ml of toluene were added so as to obtain a hydrophobic prepolymer SP2 solution that was azeotropically dehydrated. The SP2 solution was added to the HP2 solution, and then the mixed solution was stirred at 170° C. for 1.5 hours. The solution was poured into a large amount of water to deposit a white solid product, which was then filtered off. Thus obtained solid product was washed in hot water twice, and in methanol once, whereby a block copolymer PB2 was obtained. The solution viscosity η sp/c of the obtained polymer was 0.65 dl/g. The ion-exchange capacity was 0.79 mmol/g.

Sulfonation of Block Copolymer PB2 (SPB2 Synthesis)

In 180 g of 98% sulfuric acid, 20 g of the block copolymer PB2 were dissolved, and the resulting solution was stirred at room temperature for 24 hours. The solution was poured into a large amount of water to deposit a white solid product, which was then filtered off. Thus obtained solid was washed in water 5 times to obtain a polymer SPB2. The ion-exchange capacity of the polymer was 1.80 mmol/g. The hydrophilic segment, which is water-soluble when it acts solely, is removed by water washing, and the ion-exchange capacity is largely lowered. However, the ion-exchange capacity of SPB2 gave almost the same value as the calculated value, 1.84 mmol/g obtained by assuming that one sulfonic acid group was incorporated into each of the biphenol residue aromatic rings of PB2 before sulfonation. This shows that the hydrophilic segment and hydrophobic segment are bonded together. In addition, in the membrane prepared by the method described below, a phase-separation structure having an average domain distance of 31 nm was found by TEM observation. Hence, SPB2 was identified to be a block copolymer. As shown in Referenced Example 1, the hydrophobic segment is not sulfonated under the foregoing sulfonation conditions. Therefore, only the hydrophilic segment is considered to have sulfonic acid groups. Based on the SPB2 composition obtained by the H-NMR measurement, the hydrophilic segment weight fraction after the sulfonic acid groups were converted to SO$_3$H was 0.39. The ion-exchange capacity of the hydrophilic segment of SPB2 was 4.60 mmol/g.

SPB2 was formed in the same manner as in Example 1 to obtain a 48 nm membrane. The proton conductivity of the membrane was measured. The results are shown in Table 1 and FIG. 1. As compared with Comparative Example 2 described below, the proton conductivity was remarkably improved even at almost the same ion-exchange capacity.

Comparative Example 1

In a four-necked flask equipped with a stirrer, a Dean-Stark trap, a thermometer, and a nitrogen gas inlet, 42.7 g of bis(4-chlorophenyl)sulfone, 28.2 g of 4,4'-biphenol, and 27.2 g of potassium carbonate were charged; after 240 ml of dimethylsulfoxide and 30 ml of toluene were added, the reaction mixture was heated and stirred under nitrogen flow. The temperature was elevated to 180° C. while removing the generating water together with toluene, and then the reaction mixture was stirred at that temperature for 4 hours to obtain a hydrophilic segment prepolymer HP1' solution. Separately, a solution was prepared by dissolving 115 g of "SUMIKAEXCEL 7600P" in 345 ml of dimethylsulfoxide. The solution was poured into the HP'1 solution, and the mixed solution was stirred at 170° C. for 1.5 hours. After that, the solution was poured into a large amount of water to deposit a white solid product, which was then filtered off. The solid product was washed in hot water twice and in methanol once to obtain a block copolymer PB1'. The solution viscosity η sp/c of the obtained polymer was 0.71 dl/g.

In 90 g of 98% sulfuric acid, 10 g of PB 1' were dissolved, and the resulting solution was stirred at room temperature for 24 hours. The solution was poured into a large amount of water to deposit a white solid product, which was then filtered off. Thus obtained solid product was washed in hot water twice and in methanol once to obtain a sulfonated block copolymer SPB1'. The ion-exchange capacity of the obtained polymer was 1.44 mmol/g. This indicates that the hydrophilic segment was not dissolved and removed during the hot-water washing, and that the hydrophilic segment and hydrophobic segment were bonded together. In addition, in the membrane prepared in the same manner as in Example 1, a phase separation structure was found by TEM observation. This indicates that the obtained polymer SPB1' was a block copolymer. Based on the SPB1' composition obtained by the H-NMR measurement, the hydrophilic segment weight fraction after the sulfonic acid groups were converted to SO$_3$H was 0.41. The ion-exchange capacity of the hydrophilic segment of SPB1' was 3.51 mmol/g.

SPB1' was formed into a membrane in the same manner as in Example 1, and the proton conductivity of the membrane was measured. The results are shown in Table 1 and FIG. 1.

Comparative Example 2

A sulfonated block copolymer SPB2' was synthesized in the same manner as in Comparative Example 1, except that a block copolymer was synthesized by using 67 g of "SUMIKAEXCEL 7600P" and 200 ml of dimethylsulfoxide that was used to prepare the solution thereof. The ion-exchange capacity of the obtained SPB2' was 1.77 mmol/g. Based on the SPB2' composition obtained by the H-NMR measurement, the hydrophilic segment weight fraction after the sulfonic acid groups were converted to SO₃H was calculated to be 0.5. The ion-exchange capacity of the hydrophilic segment of SPB2' was 3.54 mmol/g.

SPB2' was formed into a membrane in the same manner as in Example 1, and the proton conductivity of the membrane was measured. The results are shown in Table 1 and FIG. 1.

Referenced Example 1

In 180 g of 98% sulfuric acid, 20 grams of "SUMIKAEXCEL 7600P" were dissolved. The resulting solution was stirred at room temperature for 24 hours. The solution was poured into a large amount of water so as to deposit a white solid product, which was then filtered off. Thus obtained solid product was washed in water 5 times. The ion-exchange capacity of the obtained polymer was not able to be measured, and the incorporation of sulfonic acid groups was not identified.

Referenced Example 2

A hydrophilic prepolymer was synthesized in the same manner as in Example 1, and put in water to obtain a solid product. The solution viscosity of the obtained polymer was 0.35. 52 g of the polymer was mixed and dissolved at room temperature in a hydrophobic prepolymer solution synthesized in the same manner as in Example 1. The resulting solution was poured into water to obtain a solid product that was a blend of the hydrophilic prepolymer and hydrophobic prepolymer. In 180 g of 98% sulfuric acid, 20 g of the blend were dissolved, and the resulting solution was stirred at room temperature for 24 hours. The solution was poured into a large amount of water to deposit a white solid product, which was then filtered off. Thus obtained solid product was washed in water 5 times. The ion-exchange capacity of the obtained polymer was not able to be measured. In addition, in the H-NMR measurement, only signals derived from the hydrophobic prepolymer were observed. This means that the hydrophilic prepolymer became water-soluble after the sulfonation, and was removed in the water-washing process.

Example 3

Synthesis of Polyethersulfone Block Copolymer PB3

In a four-neck separable flask equipped with a stirrer, a Dean-Stark trap, a thermometer, and a nitrogen gas inlet, 3.35 g (0.012 mol) of bis(4-chlorophenyl) sulfone, 18.34 g (0.035 mol) of 3,3'-disulfo-4,4'-dichlorodiphenylsulfone potassium salt, 8.79 g (0.047 mol) of 4,4'-biphenol, and 8.22 g of potassium carbonate were charged; after 80 g of dimethylsulfoxide and 35 g of toluene were added, the reaction mixture was heated and stirred under nitrogen flow. The temperature was elevated to 160° C. while removing the generating water together with toluene, and then the reaction mixture was stirred at that temperature for 8 hours to obtain a hydrophilic segment prepolymer HP3 solution. Here, the ratio of 4,4'-biphenol that is a dihydric phenol to the aromatic dichloride was 1.01:1. In the HP3 solution, the resulting prepolymer concentration with respect to the total amount of the prepolymer and dimethylsulfoxide was 25.2 wt %. Separately, 40.38 g of "SUMIKAEXCEL 7600P" were dissolved in 160 g of dimethylsulfoxide and 80 g of toluene, and then the resulting solution was heated and stirred under nitrogen flow. The temperature was elevated to 185° C. while removing the flowing water together with toluene, and then the solution was stirred at that temperature for 8 hours to obtain a hydrophobic segment prepolymer SP3 solution. In the HP3 solution, the concentration of the prepolymer SP3 with respect to the total amount of the prepolymer SP3 and dimethylsulfoxide was 20.2 wt %. The SP3 solution was added to the HP3 solution, and then the mixed solution was stirred at 160° C. for 2 hours. The solution was poured into a large amount of water to deposit a white solid product, which was then filtered off. Thus obtained solid product was washed in hot water twice, and in methanol once, whereby a block copolymer PB3 was obtained. The solution viscosity η sp/c of the obtained polymer was 1.05 dl/g. The ion-exchange capacity was 0.92 mmol/g.

Sulfonation of Block Copolymer PB3 (SPB3 Synthesis)

In 332 g of 98% sulfuric acid, 25 g of the block copolymer PB3 were dissolved, and the resulting solution was stirred at 40° C. for 48 hours. The solution was poured into a large amount of water to deposit a white solid product, which was then filtered off. Thus obtained solid was washed in water 5 times to obtain a polymer SPB3. The ion-exchange capacity of the obtained polymer was 2.00 mmol/g. If the polymer is a blend, the hydrophilic polymer that is water-soluble is removed by water washing after sulfonation, and the ion-exchange capacity is largely lowered. However, the ion-exchange capacity of SPB3 gave almost the same value as the calculated value, 2.08 mmol/g obtained by assuming that one sulfonic acid group was incorporated into each of the biphenol residue aromatic rings of PB3 before sulfonation. This indicates that SPB3 is not a blend, but the hydrophilic segment and hydrophobic segment are bonded together. In addition, in the membrane prepared by the method described below, a phase-separation structure having an average domain distance of 51 nm was shown by TEM observation. Hence, SPB3 was identified to be a block copolymer. The hydrophobic segment is not sulfonated under the foregoing sulfonation conditions. Therefore, only the hydrophilic segment is considered to have sulfonic acid groups. Based on the SPB3 composition obtained by the H-NMR measurement, the hydrophilic segment weight fraction after the sulfonic acid groups were converted to SO₃H was 0.41. The ion-exchange capacity of the hydrophilic segment of SPB3 was 4.88 mmol/g.

SPB3 was dissolved in N,N-dimethylacetoamide to obtain a 20 wt % solution, which was then cast on a glass plate and dried at 120° C. for 1 hour. After the resulting self-supporting membrane was peeled off from the glass plate and fixed on a metal frame, the membrane was further dried with hot air at 200° C. for 0.5 hour. The resulting membrane was immersed in a 0.5 N sodium hydroxide aqueous solution at room temperature for 2 hours, water-washed, and then immersed in a 1 N sulfuric acid aqueous solution for 4 hours. The membrane was water-washed 3 times. After the washing water was confirmed to be neutral, the membrane was fixed on a metal frame and dried at 40° C. to obtain a 32 μm thick membrane. The proton conductivity was measured at 50° C. and 70° C. with changing the relative humidity. The results are shown in Table 1.

Example 4

Synthesis of Prepolymer HP4

In a four-necked flask equipped with a stirrer, a Dean-Stark trap, a thermometer, and a nitrogen gas inlet, 8.41 g (0.045 mol) of 4,4'-biphenol and 50 g of N,N-dimethylacetoamide were charged. They were stirred at 60° C. with nitrogen gas bubbling and dissolved. After 7.87 g of potassium carbonate and 15 g of toluene were added, they were heated and stirred at 160° C. under nitrogen flow so as to remove the generating water together with toluene. After that, 6.38 g (0.022 mol) of bis(4-chlorophenyl)sulfone, 11.64 g (0.022 mol) of 3,3'-disulfo-4,4'-dichlorodiphenylsulfone potassium salt, and 60 g of N,N-dimethylacetoamide were added. The resulting reaction mixture was stirred at 160° C. for 16 hours under nitrogen flow to obtain a hydrophilic segment prepolymer HP4 solution. Here, the ratio of 4,4'-biphenol that is a dihydric phenol to the aromatic dichloride was 1.016:1. In the HP4 solution, the resulting prepolymer concentration with respect to the total amount of the prepolymer and N,N-dimethylacetoamide was 18 wt %. After insoluble substance was filtered off, the resulting filtrate was poured into a large amount of 2-propanol to deposit a white solid product, which was then vacuum-dried at 100° C. and dissolved again in N,N-dimethylacetoamide. The processes of filtration, deposition with 2-propanol, and drying were repeated to obtain a prepolymer HP4 having sulfonic acid groups in potassium form. The η sp/c of HP4 was 0.89 dl/g. The ion-exchange capacity was 1.91 mmol/g.

Synthesis of Block Copolymer PB4

In a four-necked flask equipped with a stirrer, a Dean-Stark trap, a thermometer, and a nitrogen gas inlet, 6.05 g of HP4 and 55 g of N,N-dimethylacetoamide were charged. They were stirred at 80° C. overnight under nitrogen flow so as to dissolve HP4. After 0.029 g of potassium carbonate and 10 g of toluene were added, the solution was heated and stirred at 160° C. under nitrogen flow to remove the generating water together with toluene. Separately, 7.36 g of "SUMIKAEXCEL 7600P" were dissolved in 36 g of N,N-dimethylacetoamide by stirring at 80° C. overnight under nitrogen flow, and then the resulting solution was dehydrated by adding 10 g of toluene so as to obtain a hydrophobic segment prepolymer SP4 solution. The SP4 solution was added to the HP4 solution, and then the mixed solution was stirred at 160° C. for 2 hours. The solution was filtered to remove the insoluble substance, and poured into a large amount of water to deposit a white solid product, which was then filtered off. Thus obtained solid product was washed in hot water twice, and in methanol once, whereby a block copolymer PB4 was obtained. The solution viscosity η sp/c of the obtained polymer was 1.09 dl/g. The ion-exchange capacity was 0.643 mmol/g.

Sulfonation of Block Copolymer PB4 (SPB4 Synthesis)

In 63.6 g of 95% sulfuric acid, 7.07 g of the block copolymer PB4 was dissolved, and the resulting solution was stirred at room temperature for 48 hours. The solution was poured into a large amount of water to deposit a white solid product, which was then filtered off. Thus obtained solid was washed in water 5 times to obtain a polymer SPB4. If the polymer is a blend, the hydrophilic polymer that is water-soluble is removed by water washing after sulfonation and the yield is largely lowered. However, the yield of SPB4 was 94% of the calculated value obtained by assuming that one sulfonic acid group was incorporated into each of the biphenol residue aromatic rings of PB4 before sulfonation. This indicates that SPB4 is not a blend, but the hydrophilic segment and hydrophobic segment are bonded together. The ion-exchange capacity was 1.72 mmol/g. In addition, in the membrane prepared by the method described below, a phase-separation structure having an average domain distance of 58 nm was shown by TEM observation. Hence, SPB4 was identified to be a block copolymer. The hydrophobic segment is not sulfonated under the foregoing sulfonation conditions. Therefore, only the hydrophilic segment is considered to have sulfonic acid groups. Based on the SPB4 composition obtained by the H-NMR measurement, the hydrophilic segment weight fraction after the sulfonic acid groups were converted to $SO_3H$ was 0.46. The ion-exchange capacity of the hydrophilic segment of SPB4 was 4.20 mmol/g.

SPB4 was dissolved in N,N-dimethylacetoamide to obtain a 20 wt % solution, which was then cast on a glass plate and dried at 120° C. for 1 hour. After the resulting self-supporting membrane was peeled off from the glass plate and fixed on a metal frame, the membrane was further dried with hot air at 200° C. for 0.5 hour. The resulting membrane was immersed in a 0.5 N sodium hydroxide aqueous solution at room temperature for 2 hours, water-washed, and then immersed in a 1 N sulfuric acid aqueous solution for 4 hours. The membrane was water-washed 3 times. After the washing water was confirmed to be neutral, the membrane was fixed on a metal frame and dried at 40° C. to obtain a 21 μm thick membrane. The proton conductivity was measured at 50° C. and 70° C. with changing the relative humidity. The results are shown in Table 1.

Example 5

Synthesis of Polyethersulfone Block Copolymer PB5

In a four-neck separable flask equipped with a stirrer, a Dean-Stark trap, a thermometer, and a nitrogen gas inlet, 25.33 g (0.0484 mol) of 3,3'-disulfo-4,4'-dichlorodiphenylsulfone potassium salt, 9.10 g (0.0489 mol) of 4,4'-biphenol, and 8.51 g of potassium carbonate were charged; after 122 g of dimethylsulfoxide and 45 g of toluene were added, the reaction mixture was heated and stirred under a nitrogen gas atmosphere. The temperature was elevated to 160° C. while removing the generating water together with toluene, and then the reaction mixture was stirred at that temperature for 8 hours to prepare a hydrophilic segment prepolymer HP5 solution. Here, the ratio of 4,4'-biphenol that is a dihydric phenol to the aromatic dichloride was 1.01:1. In the HP5 solution, the resulting prepolymer concentration with respect to the total amount of the prepolymer and dimethylsulfoxide was 20.2 wt %. Separately, 42.2 g of "SUMIKAEXCEL 7600P" were dissolved in 211 g of dimethylsulfoxide and 28 g of toluene, and then the resulting solution was heated and stirred under nitrogen flow. The temperature was elevated to 185° C. while removing the flowing water together with toluene, and then the solution was stirred at that temperature for 8 hours to prepare a hydrophobic segment prepolymer SP5 solution. In the SP5 solution, the concentration of the prepolymer SP5 with respect to the total amount of the prepolymer SP5 and dimethylsulfoxide was 20.0 wt %. The SP5 solution was added to the HP5 solution, and then the mixed solution was stirred at 160° C. for 2 hours. The solution was poured into a large amount of water to deposit a white solid product, which was then filtered off. Thus obtained solid product was washed in hot water twice, and in methanol once, whereby a block copolymer PB5 was obtained. The solution viscosity η sp/c of the obtained polymer was 0.84 dl/g. The ion-exchange capacity was 0.931 mmol/g.

Sulfonation of Block Copolymer PB5 (SPB5 Synthesis)

In 351 g of 98% sulfuric acid, 30 g of the block copolymer PB5 were dissolved, and the resulting solution was stirred at room temperature for 72 hours. The solution was poured into a large amount of water to deposit a white solid product, which was then filtered off. Thus obtained solid was washed in water 5 times to obtain a polymer SPB5. The ion-exchange capacity of the polymer was 1.69 mmol/g. If the polymer is a blend, the hydrophilic polymer that is water-soluble is removed by water washing after sulfonation and the ion-exchange capacity is largely lowered. However, the ion-exchange capacity of SPB5 gave almost the same value as the calculated value, 1.69 mmol/g obtained by using the composition ratio obtained by the H-NMR measurement for PB5 before sulfonation, and by assuming that one sulfonic acid group was incorporated into each of the biphenol residue aromatic rings before sulfonation. This indicates that SPB5 is not a blend, but the hydrophilic segment and hydrophobic segment are bonded together. In addition, in the membrane prepared by the method described below, a phase-separation structure was shown by TEM observation. Hence, SPB5 was identified to be a block copolymer. The hydrophobic segment is not sulfonated under the foregoing sulfonation conditions. Therefore, only the hydrophilic segment is considered to have sulfonic acid groups. Based on the SPB5 composition obtained by the H-NMR measurement, the hydrophilic segment weight fraction after the sulfonic acid groups were converted to $SO_3H$ was 0.30. The ion-exchange capacity of the hydrophilic segment of SPB5 was 5.63 mmol/g.

SPB5 was dissolved in N,N-dimethylacetoamide to obtain a 20 wt % solution, which was then cast on a glass plate and dried at 120° C. for 1 hour. After the resulting self-supporting membrane was peeled off from the glass plate and fixed on a metal frame, the membrane was further dried with hot air at 200° C. for 0.5 hour. The resulting membrane was immersed in a 0.5 N sodium hydroxide aqueous solution at room temperature for 2 hours, water-washed, and then immersed in a 1 N sulfuric acid aqueous solution for 4 hours. The membrane was water-washed 3 times. After the washing water was confirmed to be neutral, the membrane was fixed on a metal frame and dried at 40° C. to obtain a 38 nm thick membrane. The proton conductivity was measured at 70° C. with changing the relative humidity. The results are shown in Table 1.

diffusion electrode, which was loaded with 20 wt % of Pt and 10 wt % of Ru, another power generation test was performed using 10 wt % methanol solution in place of hydrogen at room temperature and an oxygen utilization of 25% without humidification for oxygen. A cell voltage of 0.25 V was obtained at a current density of 0.1 $A/cm^2$.

Example 7

Polymerization of Block Polymer PB7

In a flask were charged 28.7 g of bis(4-chlorophenyl)sulfone, 18.9 g of 4,4'-biphenol, and 16.8 g of potassium carbonate. After 160 ml of dimethylsulfoxide and 50 ml of toluene were added, the reaction mixture was heated and stirred under nitrogen flow. The temperature was elevated to 175° C. while removing the generating water together with toluene, and then the reaction mixture was stirred at that temperature for 16 hours to prepare a polymer solution A. Separately, a solution was prepared by dissolving 73 g of polyethersulfone ("SUMIKAEXCEL 7600P", manufactured by Sumitomo Chemical Co., Ltd.) in 290 mL of dimethylsulfoxide. The solution was poured into the polymer solution A, and then the mixed solution was stirred at 170° C. for 1.5 hours. The solution was poured into a large amount of water to deposit a white solid product, which was then filtered off. Thus obtained solid product was washed in hot water twice, and in methanol once, whereby a block copolymer PB7 was obtained. The solution viscosity $\eta_{sp/c}$ of the obtained polymer was 0.71 dl/g.

Sulfonation of Block Polymer PB7 (SPB7 Synthesis)

In 200 ml of 98% sulfuric acid, 20 g of the block polymer PB7 were dissolved, and the resulting solution was stirred at

TABLE 1

Properties of aromatic block copolymers

| | Ion-exchange capacity | | Proton conductivity | | | | |
|---|---|---|---|---|---|---|---|
| | | | 50° C. | | | 70° C. | |
| | Whole polymer (mmol/g) | Hydrophilic segment (mmol/g) | 40% RH*[1] (S/cm) | 60% RH*[1] (S/cm) | 90% RH*[1] (S/cm) | 30% RH*[1] (S/cm) | 90% RH*[1] (S/cm) |
| Example 1 | 1.46 | 4.73 | $6 \times 10^{-3}$ | $1.5 \times 10^{-2}$ | 0.13 | $2.3 \times 10^{-3}$ | 0.11 |
| Comparative Example 1 | 1.44 | 3.51 | $1 \times 10^{-3}$ | $5 \times 10^{-3}$ | $4.8 \times 10^{-2}$ | $8.7 \times 10^{-4}$ | $8.2 \times 10^{-2}$ |
| Example 2 | 1.80 | 4.60 | $9 \times 10^{-3}$ | $3.2 \times 10^{-2}$ | 0.18 | $4.0 \times 10^{-3}$ | 0.20 |
| Comparative Example 2 | 1.77 | 3.54 | $3 \times 10^{-3}$ | $9.6 \times 10^{-3}$ | 0.11 | $1.9 \times 10^{-3}$ | 0.14 |
| Example 3 | 2.00 | 4.88 | $1.1 \times 10^{-2}$ | | 0.21 | $6.6 \times 10^{-3}$ | 0.26 |
| Example 4 | 1.72 | 4.20 | $8.7 \times 10^{-3}$ | | 0.14 | $3.7 \times 10^{-3}$ | 0.21 |
| Example 5 | 1.69 | 5.63 | | | | $6.1 \times 10^{-3}$ | 0.23 |

*[1]Relative humidity

Example 6

Figure 2:
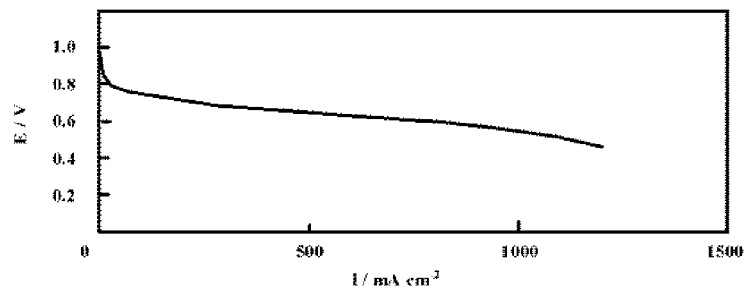
FIG. 2 shows the result of power generation test at a temperature of 70° C.

On both sides of the membrane obtained in Example 2, gas diffusion electrodes EC20-10-10 (1.0 $mg/cm^2$ of Pt content) manufacture by ElectroChem. Inc. were attached by pressing at 130° C. for 5 minutes to prepare a membrane/electrode assembly (hereinafter, referred to as "MEA"). The resulting MEA was assembled into a fuel cell set FC25-02SP manufactured by ElectroChem. Inc. Power generation test was performed at a cell temperature of 70° C., a hydrogen utilization of 50%, an oxygen utilization of 25%, a hydrogen humidifying temperature of 70° C., and an oxygen humidifying temperature of 30° C. A power generation curve thus obtained is shown in FIG. 2. Further, with the use of an electrode cell manufactured by ElectroChem. Inc. as a gas room temperature for 24 hours. The solution was poured into a large amount of water to deposit a white solid product, which was then filtered off. Thus obtained solid was washed in water 5 times to obtain a sulfonated block copolymer SPB7 that was composed of a hydrophilic segment substantially consisting of the structural unit represented by the following formula (20) and a hydrophobic segment consisting of the structural unit represented by the following formula (21). The ion-exchange capacity of the obtained polymer was 1.63 mmol/g. If SPB7 is a blend, the ion-exchange capacity is largely lowered by water washing after sulfonation, because the water-soluble hydrophilic polymer is removed and the ion-exchange capacity is largely lowered. However, the ion-exchange capacity of SPB7 gave almost the same value as the calculated value, 1.71 mmol/g obtained by assuming that one sulfonic acid group was incorporated into each of the biphenol residue aromatic rings of PB7 before sulfonation. This indicates that SPB7 is not a blend and that the hydrophilic segment and hydrophobic segment are bonded together. In addition, in the membrane of SPB7 alone that was prepared by the method described below, a phase-separation structure was shown by TEM observation. Hence SPB7 is considered to be a block copolymer. The hydrophobic segment is not sulfonated under the foregoing sulfonation conditions. Only the hydrophilic segment is considered to have a structure with sulfonic acid groups. Based on the SPB7 composition obtained by the H-NMR measurement, the hydrophilic segment weight fraction after the sulfonic acid groups were converted to $SO_3H$ was 0.48. The ion-exchange capacity of the hydrophilic segment of SPB7 was 3.4 mmol/g.

[Formula 19]

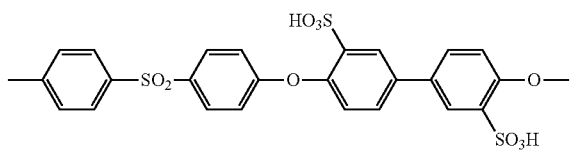

(20)

[Formula 20]

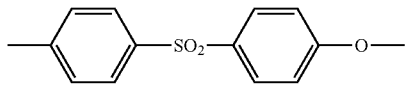

(21)

<Membrane Preparation>

A solution with a solid content of 20 wt % was prepared by dissolving in N,N-dimethylacetoamide, so that the composition ratio (weight) of the sulfonated block copolymer SPB7 thus obtained to a polyethersulfone ("SUMIKAEXCEL 4100P", manufactured by Sumitomo Chemical Co., Ltd.) having the same structural unit as that of the hydrophobic segment of SPB7 results in 9:1. The solution was cast on a glass plate, and then dried with hot air at 120° C. for 1 hour. The resulting membrane was peeled off from the glass plate, fixed on a stainless steel frame, and further heated and dried at 200° C. for 30 minutes. Thus obtained membrane was immersed in a 0.5 N NaOH aqueous solution for 2 hours at room temperature, further in a 1 $NH_2SO_4$ aqueous solution for 2 hours, water-washed, and then fixed and dried on a stainless steel frame to obtain a 30 μm thick polymer electrolyte membrane. Similarly, the preparation and treatment of a membrane were carried out using only SPB1 to obtain a 32 μm thick SPB7 membrane. The properties of the membrane prepared from the composition are shown in Table 2.

Example 8

Polymerization of Polyethersulfone Block Copolymer PB8

In a four-necked flask equipped with a stirrer, a Dean-Stark trap, a thermometer, and a nitrogen gas inlet, 12.71 g of bis(4-fluorophenyl)sulfone, 22.91 g of 3,3'-disulfo-4,4'-difluorodiphenylsulfone sodium salt, 18.9 g of 4,4'-biphenol, and 17 g of potassium carbonate were charged; after 200 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to prepare a hydrophilic prepolymer HP8 solution. Separately, 100 g of "SUMIKAEXCEL 7600P" having the structural unit represented by the following formula (22) were dissolved in 310 ml of dimethylsulfoxide; and then 50 ml of toluene were added so as to obtain a hydrophobic prepolymer SP8 solution that was azeotropically dehydrated. The SP8 solution was added to the HP8 solution, and then the mixed solution was stirred at 160° C. for 2 hours. The solution was poured into a large amount of water to deposit a white solid product, which was then filtered off. Thus obtained solid product was washed in hot water twice, and in methanol once, whereby a block copolymer PB8 was obtained. The solution viscosity $\eta_{sp/c}$ of the obtained polymer was 0.65 dl/g. The ion-change capacity was 0.79 mmol/g.

[Formula 21]

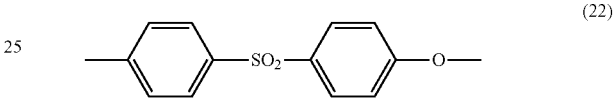

(22)

Sulfonation of Block Copolymer PB8 (SPB8 Synthesis)

In 200 ml of 98% sulfuric acid, 20 g of block polymer PB8 were dissolved, and the resulting solution was stirred at room temperature for 48 hours. The solution was poured into a large amount of water to deposit a white solid product, which was then filtered off. Thus obtained solid product was washed in water 5 times to obtain a sulfonated block copolymer SPB8 composed of a hydrophilic segment having the random copolymer structure represented by the following formula (23) and a hydrophobic segment having the structural unit represented by the following formula (24). The ion-exchange capacity of the obtained polymer was 1.80 mmol/g. If the product is a blend, the water-soluble hydrophilic polymer is removed by water washing after sulfonation, and the ion-exchange capacity is largely lowered. However, the ion-exchange capacity of SPB8 gave almost the same value as the calculated value, 1.84 mmol/g obtained by assuming that one sulfonic acid group was incorporated into each of the biphenol residue aromatic rings of PB8 before sulfonation. This indicates that SPB8 is not a blend, and that the hydrophilic segment and hydrophobic segment are bonded together. In addition, in the membrane of SPB8 alone that was prepared in the same manner as described below, a phase-separation structure was shown by TEM observation. Hence, SPB8 was identified to be a block copolymer. The hydrophobic segment is not sulfonated under the foregoing sulfonation conditions, so that SPB8 has such a structure that only the hydrophilic segment has sulfonic acid groups. Based on the SPB8 composition obtained by the H-NMR measurement, the hydrophilic segment weight fraction after the sulfonic acid groups were converted to $SO_3H$ was 0.39. The ion-exchange capacity of the hydrophilic segment of SPB8 was 4.6 mmol/g.

[Formula 22]

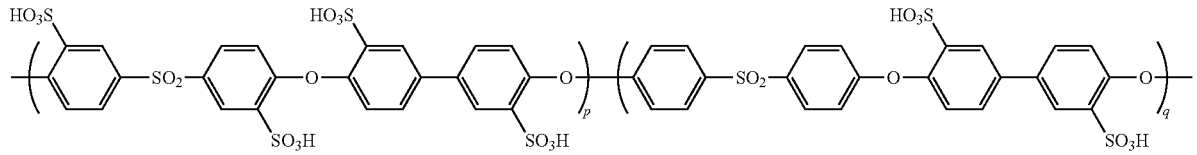

(23)

wherein, p and q represent the mol fraction of each structural unit respectively; and p=0.5 and q=0.5.

[Formula 23]

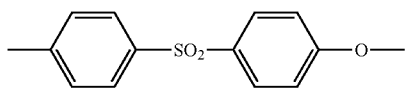

(24)

<Membrane Preparation>

A composition solution was prepared by dissolving in N,N-dimethylacetoamide (solid content: 20 wt %), so that the composition ratio (weight) of SPB8 to a polyethersulfone ("SUMIKAEXCEL 7600P", manufactured by Sumitomo Chemical Co., Ltd.) having the same structure as that of the hydrophobic segment of SPB8 results in 8:2. The solution was then cast on a glass plate and dried at 120° C. for 1 hour. The resulting self-supporting membrane was peeled off from the glass plate, fixed on a stainless steel frame, further dried with hot air at 200° C. for 0.5 hour to obtain a 28 nm thick membrane. The resulting membrane was immersed in a 0.5 N sodium hydroxide aqueous solution at room temperature for 2 hours, water-washed, immersed in a 1 N sulfuric acid aqueous solution for 4 hours, and then water-washed 3 times. After the washing water was confirmed to be neutral, the membrane was fixed on a stainless steel frame and dried. The properties of the membrane prepared from the composition are shown in Table 2.

Comparative Example 3

A 32 μm thick polymer electrolyte membrane was prepared in the same manner as in Example 2, except that a polysulfone (available from Aldrich, 26,000 of number average molecular weight) that has the structure represented by the following formula (25) was used in place of the polyethersulfone ("SUMIKAEXCEL 7600P", manufactured by Sumitomo Chemical Co., Ltd.). The properties of the resulting membrane are shown in the table. As compared with Example 2, the proton conductivity was largely lowered at low humidity, and the properties on water absorption were less improved.

Example 9

Polymerization of Polyethersulfone Block Copolymer PB9

In a four-necked flask equipped with a stirrer, a Dean-Stark trap, a thermometer, and a nitrogen gas inlet, 6.36 g of bis(4-fluorophenyl)sulfone, 34.37 g of 3,3'-disulfo-4,4'-difluorodiphenylsulfone sodium salt, 18.9 g of 4,4'-biphenol, and 17 g of potassium carbonate were charged; after 200 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to prepare a hydrophilic prepolymer HP9 solution. Separately, 86.7 g of "SUMIKAEXCEL 7600P" were dissolved in 340 ml of dimethylsulfoxide. To the resulting solution, 50 ml of toluene were added so as to obtain a hydrophobic prepolymer SP9 solution that was azeotropically dehydrated. The SP9 solution was added to the HP9 solution, and then the mixed solution was stirred at 160° C. for 2.5 hours. The solution was poured into a large amount of water to deposit a white solid product, which was then filtered off. Thus obtained solid product was washed in hot water twice, and in methanol once, whereby a block copolymer PB3 was obtained. The solution viscosity $\eta_{sp/c}$ of the obtained polymer was 0.70 dl/g. The ion-change capacity was 0.99 mmol/g.

Sulfonation of Block Copolymer PB9 (SPB9 Synthesis)

In 200 ml of 98% sulfuric acid, 20 g of block copolymer PB9 were dissolved, and the resulting solution was stirred at room temperature for 48 hours. The solution was poured into a large amount of water to deposit a white solid product, which was then filtered off. Thus obtained solid was washed in water 5 times to obtain a sulfonated block copolymer SPB9 having a hydrophilic segment with the random copolymer structure represented by the following formula (26) and a hydrophobic segment with the structural unit represented by the following formula (27). The ion-exchange capacity of the polymer thus obtained was 2.01 mmol/g.

[Formula 24]

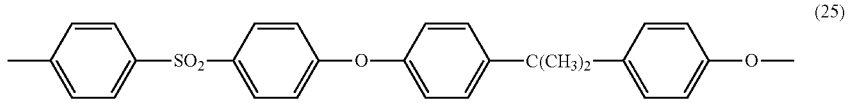

(25)

[Formula 25]

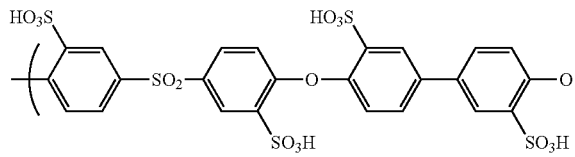 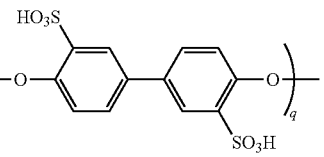

(26)

wherein, p and q represent the mole fraction of each structural unit respectively; and p=0.75 and q=0.25.

[Formula 26]

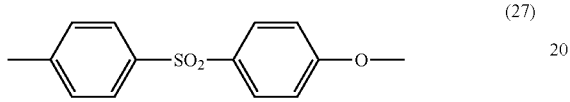

(27)

The hydrophilic segment, which is water-soluble when it acts solely, is removed by water washing, and the ion-exchange capacity is lowered largely. However, the ion-exchange capacity of SPB9 gave almost the same value as the calculated value, 2.27 mmol/g obtained by assuming that one sulfonic acid group was incorporated into each of the biphenol residue aromatic rings of PB9 before sulfonation. This indicates that the hydrophilic segment and hydrophobic segment are bonded together.

If the product is a blend, the water-soluble hydrophilic polymer is removed and the ion-exchange capacity is largely lowered by water washing after sulfonation. However, the ion-exchange capacity of SPB9 gave almost the same value as the calculated value, 2.27 mmol/g obtained by assuming that one sulfonic acid group was incorporated into each of the biphenol residue aromatic rings of PB9 before sulfonation. This indicates that SPB9 is not a blend, and that the hydrophilic segment and hydrophobic segment are bonded together. In addition, in the membrane of SPB9 alone prepared in the same manner as described below, a phase-separation structure was observed by TEM observation. Hence, SPB9 was identified to be a block copolymer. The hydrophobic segment is not sulfonated under the foregoing sulfonation conditions, so that SPB9 has such a structure that only the hydrophilic segment has sulfonic acid groups. Based on the SPB9 composition obtained by the H-NMR measurement, the hydrophilic segment weight fraction after the sulfonic acid groups were converted to $SO_3H$ was 0.43. The ion-exchange capacity of the hydrophilic segment of SPB9 was 4.54 mmol/g.

<Membrane Preparation>

A composition solution was prepared by dissolving in N,N-dimethylacetoamide (solid content: 20 wt %), so that the composition ratio (weight) of SPB9 to a polyethersulfone ("SUMIKAEXCEL 4100P", manufactured by Sumitomo Chemical Co., Ltd.) having the same structure as that of the hydrophobic segment results in 8:2. The solution was then cast on a glass plate and dried at 120° C. for 1 hour. The resulting self-supporting membrane was peeled off from the glass plate, fixed on a stainless steel frame, further dried with hot air at 200° C. for 0.5 hour to obtain a 28 nm thick membrane. The resulting membrane was immersed in a 0.5 N sodium hydroxide aqueous solution at room temperature for 2 hours, water-washed, immersed in a 1 N sulfuric acid aqueous solution for 4 hours, and then water-washed 3 times. After the washing water was confirmed to be neutral, the membrane was fixed on a stainless steel frame and dried. The properties of the membrane prepared from the composition are shown in Table 2.

Comparative Example 4

A sulfonated block copolymer SPB9' having the same hydrophilic segment and hydrophobic segment as the ones in Example 9 and a different weight ratio of the hydrophobic segment to hydrophilic segment was synthesized in the same manner as in Example 9, except that 158 g of "SUMIKAEXCEL 7600P" were dissolved in 640 ml of dimethylsulfoxide in the synthesis of the block copolymer PB9 in Example 9. The ion-exchange capacity of the obtained SPB9' was 1.54 mmol/g and was identified to be a block copolymer in the same manner as in Example 9. A membrane composed of SPB9' solely was prepared in the same manner as in Example 9. The properties of the membrane are shown in the table. As compared with the membrane in Example 9 having the same ion-exchange capacity, the proton conductivity at low humidity was lower.

Example 10

SPB9 synthesized in Example 9, and the block copolymer PB7 before sulfonation that was synthesized in Example 7 and had a segment composed of the same structural unit as that of the hydrophobic segment of SPB9 were dissolved in a SPB9:PB7 weight ratio of 9:1 in N,N-dimethylacetoamide (solid content: 20 wt %). The resulting solution was cast on a glass plate and dried at 120° C. for 1 hour. The resulting self-supporting membrane was peeled off from the glass plate, fixed on a stainless steel frame, further dried with hot air at 200° C. for 0.5 hour to obtain a 28 nm thick membrane. The resulting membrane was immersed in a 1 N sodium hydroxide aqueous solution at room temperature for 2 hours, water-washed, and then immersed in a 1 N sulfuric acid aqueous solution for 4 hours. The membrane was water-washed 3 times. After the washing water was confirmed to be neutral, the membrane was fixed on a stainless steel frame and dried. The properties of the obtained membrane are shown in Table 2.

Example 11

Polymerization of Polyethersulfone Block Copolymer PB 11

In a four-necked flask equipped with a stirrer, a Dean-Stark trap, a thermometer, and a nitrogen gas inlet, 45.83 g of 3,3'-disulfo-4,4'-difluorodiphenylsulfone sodium salt, 18.9 g of 4,4'-biphenol, and 17 g of potassium carbonate were charged; after 200 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to prepare a hydrophilic prepolymer HP11 solution. Separately, 99.2 g of "SUMIKAEXCEL 7600P" were dissolved in 395 ml of dimethylsulfoxide; and then 50 ml of toluene were added so as to prepare a hydrophobic prepolymer SP11 solution that was azeotropically dehydrated. The SP11 solution was added to the HP11 solution, and then the mixed solution was stirred at 160° C. for 2.5 hours. The solution was poured into a large amount of water to deposit a white solid product, which was then filtered off. Thus obtained solid product was washed in hot water twice, and in methanol once, whereby a block copolymer PB11 was obtained. The solution viscosity $\eta_{sp/c}$ of the obtained polymer was 0.63 dl/g. The ion-change capacity was 1.18 mmol/g.

Sulfonation of Block Copolymer PB11 (SPB 11 Synthesis)

In 200 ml of 98% sulfuric acid, 20 g of block copolymer PB11 were dissolved, and the resulting solution was stirred at room temperature for 48 hours. The solution was poured into a large amount of water to deposit a white solid product, which was then filtered off. Thus obtained solid product was washed in water 5 times to obtain a sulfonated block copolymer SPB11 composed of a hydrophilic segment having the structural unit represented by the following formula (28) and a hydrophobic segment having the structural unit represented by the following formula (29). The ion-exchange capacity of the obtained polymer was 2.2 mmol/g.

[Formula 27]

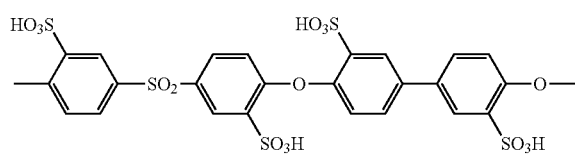

(28)

[Formula 28]

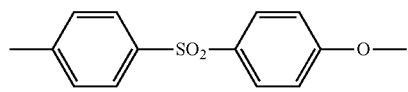

(29)

The hydrophilic segment, which is water-soluble when it acts solely, is removed by water washing and the ion-exchange capacity is lowered largely. However, the ion-exchange capacity of SPB11 gave almost the same value as the calculated value, 2.35 mmol/g obtained by assuming that one sulfonic acid group was incorporated into each of the biphenol residue aromatic rings of PB11 before sulfonation. This indicates that the hydrophilic segment and hydrophobic segment are bonded together.

If the product is a blend, the water-soluble hydrophilic polymer is removed and the ion-exchange capacity is largely decreased by water washing after sulfonation. However, the ion-exchange capacity of SPB11 gave almost the same value as the calculated value, 2.35 mmol/g obtained by assuming that one sulfonic acid group was incorporated into each of the biphenol residue aromatic rings of PB11 before sulfonation. This indicates that SPB11 is not a blend, and that the hydrophilic segment and hydrophobic segment are bonded together. In addition, in the membrane of SPB11 alone that was prepared in the same manner as described below, a phase-separation structure was observed by TEM observation. Hence, SPB11 was identified to be a block copolymer. The hydrophobic segment is not sulfonated under the foregoing sulfonation conditions, so that SPB11 has such a structure that only the hydrophilic segment has sulfonic acid groups. Based on the SPB11 composition obtained by the H-NMR measurement, the hydrophilic segment weight fraction after the sulfonic acid groups were converted to SO$_3$H was 0.42. The ion-exchange capacity of the hydrophilic segment of SPB11 was 5.2 mmol/g.

<Membrane Preparation>

A composition solution was prepared by dissolving in N,N-dimethylacetoamide (solid content: 20 wt %), so that the composition ratio (weight) of SPB11 to a polyethersulfone ("SUMIKAEXCEL 4100P", manufactured by Sumitomo Chemical Co., Ltd.) having the same structure as that of the hydrophobic segment results in 9:1. The solution was then cast on a glass plate and dried at 120° C. for 1 hour. The resulting self-supporting membrane was peeled off from the glass plate, fixed on a stainless steel frame, further dried with hot air at 200° C. for 0.5 hour to obtain a 28 μm thick membrane. The membrane was immersed in a 0.5 N sodium hydroxide aqueous solution at room temperature for 2 hours, water-washed, immersed in a 1 N sulfuric acid aqueous solution for 4 hours, and then water-washed 3 times. After the washing water was confirmed to be neutral, the membrane was fixed on a stainless steel frame and dried. The properties of the membrane prepared from the composition are shown in Table 2.

Comparative Example 5

Synthesis of Random Copolymer PR1

25.42 g of bis(4-fluorophenyl)sulfone, 15.93 g of bis(4-hydroxyphenyl) sulfone, and 6.77 g of 4,4'-biphenol were charged; after 170 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to prepare a polymer solution. The solution was poured into a large amount of water to deposit a white solid product, which was then filtered off. Thus obtained solid product was washed in hot water twice, and in methanol once, whereby a polymer PR1 was obtained. The solution viscosity $\eta_{sp/c}$ of the obtained polymer PR1 was 0.53 dl/g.

Sulfonation of Random Copolymer PR1

In 200 ml of 98% sulfuric acid, 21 g of random copolymer PR1 were dissolved, and the resulting solution was stirred at room temperature for 24 hours. The solution was poured into a large amount of water to deposit a white solid product, which was then filtered off. Thus obtained solid product was washed in water 5 times to obtain a polymer SPR1. The ion-exchange capacity of the polymer was 1.47 mmol/g. In the SPR1 membrane prepared in the same manner as described below, a phase-separation structure was not observed by TEM observation, and the membrane was observed to be uniform. Hence, the polymer was identified to be a random copolymer.

<Membrane Preparation>

A composition solution was prepared by dissolving in N,N-dimethylacetoamide (solid content: 20 wt %), so that the composition ratio (weight) of SPR1 and a polyethersulfone ("SUMIKAEXCEL 4100P", manufactured by Sumitomo Chemical Co., Ltd.) having the same structure results in 9:1. The solution was then cast on a glass plate and dried at 120° C. for 1 hour. The resulting self-supporting membrane was peeled off from the glass plate, fixed on a stainless steel frame, further dried with hot air at 200° C. for 0.5 hour to obtain a 28 µm thick membrane. The resulting membrane was immersed in a 0.5 N sodium hydroxide aqueous solution at room temperature for 2 hours, water-washed, immersed in a 1 N sulfuric acid aqueous solution for 4 hours, and then water-washed 3 times. After the washing water was confirmed to be neutral, the membrane was fixed on a stainless steel frame and dried. The properties of the membrane prepared from the composition are shown in Table 2.

for 6 hours while stirring. After the resulting solution was gradually added to ice water, sodium chloride was added so as to deposit a solid product. The solid product was dissolved again in water. After the resulting solution was neutralized with NaOH, sodium chloride was added so as to deposit a solid product again. The solid product was recrystallized twice with an ethanol/water (4/1) mixture and dried to obtain a white solid product. Thus obtained white solid product provided H-NMR signals at from 7.6 to 7.7 ppm, from 7.8 to 7.9 ppm, and from 8.3 to 8.4 ppm with the integrated intensities of 1:1:1. The white solid product was identified to be 3,3'-disulfo-4,4'-dichlorodiphenylsulfone sodium salt.

TABLE 2

|  | Ion-exchange capacity (mmol/g) | Proton conductivity (70° C.) | | Mechanical properties on water-absorption | |
|---|---|---|---|---|---|
|  |  | 30% RH (mS/cm) | 90% RH (mS/cm) | Elasticity (GPa) | Strength at break (MPa) |
| Example 7 | 1.31 | 1.1 | 140 | 0.23 | 27 |
|  | Percent of retention (%) | 73 | 100 | 190 | 180 |
| Example 8 | 1.44 | 2.2 | 150 | 0.27 | 25 |
|  | Percent of retention (%) | 55 | 75 | 180 | 132 |
| Comparative Example 3 | 1.44 | 1.1 | 150 | 0.20 | 17 |
|  | Percent of retention (%) | 28 | 75 | 133 | 89 |
|  | Ratio to Example 2 | 0.5 | 1.0 | 0.74 | 0.68 |
| Example 9 | 1.51 | 4.3 | 200 | 0.25 | 26 |
|  | Percent of retention (%) | 73 | 57 | 139 | 130 |
| Comparative Example 4 | 1.54 | 1.53 | 180 | 0.22 | 22 |
|  | Ratio to Example 3 | 0.36 | 0.9 | 0.88 | 0.85 |
| Example 10 | 1.70 | 5.1 | 220 | 0.22 | 23 |
|  | Percent of retention (%) | 87 | 63 | 122 | 115 |
| Example 11 | 1.98 | 5.9 | 230 | 0.21 | 23 |
|  | Percent of retention (%) | 80 | 100 | 131 | 147 |
| Comparative Example 5 | 1.32 | 0.5 | 130 | 0.21 | 21 |
|  | Ratio to Example 1 | 0.45 | 0.93 | 0.91 | 0.78 |

(1) The percent of retention was obtained from 100 × D2/D1, wherein D1 is each property value of a membrane prepared from a sulfonated polymer alone, and D2 is each property value of a composition.
(2) In each Comparative Example, the ratio to the corresponding Example was obtained from D4/D3, wherein D3 is each property value of the corresponding Example, and D4 is each property value of corresponding Comparative Example.

Synthesis Example 2

Synthesis of 3,3'-Disulfo-4,4'-Dichlorodiphenylsulfone Potassium Salt

In a flask 120 g of bis(4-chlorophenyl)sulfone and 250 g of 30% fuming sulfuric acid were charged, and heated at 110° C. for 6 hours while stirring. After the resulting solution was gradually added to ice water, potassium chloride was added so as to deposit a solid product. The solid product was dissolved again in water, and then potassium chloride was added so as to deposit a solid product. The solid product was filtered off, recrystallized twice with an ethanol/water (6/4) mixture, and dried to obtain a white solid product. Thus obtained white solid product provided H-NMR signals at 7.66 ppm, 7.84, and 8.35 ppm with the integrated intensities of 1:1:1. The white solid product was identified to be 3,3'-disulfo-4,4'-dichlorodiphenylsulfone potassium salt.

Synthesis Example 3

Synthesis of 3,3'-Disulfo-4,4'-Dichlorodiphenylsulfone Sodium Salt

In a flask 120 g of bis(4-chlorophenyl)sulfone and 250 g of 30% fuming sulfuric acid were charged, and heated at 110° C.

Example 12

Synthesis of Polyethersulfone Block Copolymer PB12

In a four-neck separable flask equipped with a stirrer, a Dean-Stark trap, a thermometer, and a nitrogen gas inlet, 3.35 g (0.012 mol) of bis(4-chlorophenyl) sulfone, 18.34 g (0.035 mol) of 3,3'-disulfo-4,4'-dichlorodiphenylsulfone potassium salt, 8.79 g (0.047 mol) of 4,4'-biphenol, and 8.22 g of potassium carbonate were charged; after 80 g of dimethylsulfoxide and 35 g of toluene were added, the reaction mixture was heated and stirred under nitrogen flow. The temperature was elevated to 160° C. while removing the generating water together with toluene, and then the reaction mixture was stirred at that temperature for 8 hours to prepare a hydrophilic segment prepolymer HP12 solution. Here, the ratio of 4,4'-biphenol that is a dihydric phenol to the aromatic dichloride was 1.01:1. The resulting prepolymer concentration with respect to the total amount of the prepolymer and dimethylsulfoxide in the HP12 solution was 25.2 wt %. Separately, 40.38 g of "SUMIKAEXCEL 7600P" were dissolved in 160 g of dimethylsulfoxide and 80 g of toluene, and then the resulting solution was heated and stirred under nitrogen flow. The temperature was elevated to 185° C. while removing the flowing water together with toluene, and then the solution was stirred at that temperature for 8 hours to prepare a hydrophobic segment prepolymer SP12 solution. The concentration of the prepolymer SP12 with respect to the total amount of the prepolymer SP12 and dimethylsulfoxide in the SP12 solution was 20.2 wt %. The SP12 solution was added to the HP12 solution, and then the mixed solution was stirred at 160° C. for 2 hours. The solution was poured into a large amount of water to deposit a white solid product, which was then filtered off. Thus obtained solid product was washed in hot water twice, and in methanol once, whereby a block copolymer PB12 was obtained. The solution viscosity $\eta_{sp/c}$ of the obtained polymer was 1.05 dl/g. The ion-exchange capacity was 0.92 mmol/g.

Sulfonation of Block Copolymer PB12 (SPB12 Synthesis)

In 332 g of 98% sulfuric acid 25 g of the block copolymer PB12 were dissolved, and the resulting solution was stirred at 40° C. for 48 hours. The solution was poured into a large amount of water to deposit a white solid product, which was then filtered off. Thus obtained solid was washed in water 5 times to obtain a polymer SPB12. The ion-exchange capacity of the polymer was 2.00 mmol/g. If the polymer is a blend, the hydrophilic polymer that is water-soluble is removed by water washing after sulfonation and the ion-exchange capacity is largely lowered. However, the ion-exchange capacity of SPB12 gave almost the same value as the calculated value, 2.08 mmol/g obtained by assuming that one sulfonic acid group was incorporated into each of the biphenol residue aromatic rings of PB12 before sulfonation. This indicates that SPB12 is not a blend, but the hydrophilic segment and hydrophobic segment are bonded together. In addition, in the membrane prepared by the method described below, a phase-separation structure was observed by TEM observation. Hence, SPB12 was identified to be a block copolymer. The hydrophobic segment is not sulfonated under the foregoing sulfonation conditions. Therefore, only the hydrophilic segment is considered to have sulfonic acid groups. Based on the SPB12 composition obtained by the H-NMR measurement, the hydrophilic segment weight fraction after the sulfonic acid groups were converted to $SO_3H$ was 0.41. The ion-exchange capacity of the hydrophilic segment of SPB12 was 4.88 mmol/g.

SPB12 was dissolved in N,N-dimethylacetoamide to obtain a 20 wt % solution, which was then cast on a glass plate and dried at 120° C. for 1 hour. After the resulting self-supporting membrane was peeled off from the glass plate and fixed on a metal frame, the membrane was further dried with hot air at 200° C. for 0.5 hour. The resulting membrane was immersed in a 0.5 N sodium hydroxide aqueous solution at room temperature for 2 hours, water-washed, and then immersed in a 1 N sulfuric acid aqueous solution for 4 hours. The membrane was water-washed 3 times. After the washing water was confirmed to be neutral, the membrane was fixed on a metal frame and dried at 40° C. to obtain a 32 μm thick membrane. The proton conductivity was measured at 70° C. with changing the relative humidity. The results are shown in Table 3.

Example 13

Synthesis of Prepolymer HP13

In a four-necked flask equipped with a stirrer, a Dean-Stark trap, a thermometer, and a nitrogen gas inlet, 8.41 g (0.045 mol) of 4,4'-biphenol and 50 g of N,N-dimethylacetoamide were charged. They were stirred at 60° C. with nitrogen gas bubbling and dissolved. After 7.87 g of potassium carbonate and 15 g of toluene were added, they were heated and stirred at 160° C. under nitrogen flow so as to remove the generating water together with toluene. After that, 6.38 g (0.022 mol) of bis(4-chlorophenyl)sulfone, 11.64 g (0.022 mol) of 3,3'-disulfo-4,4'-dichlorodiphenylsulfone potassium salt, and 60 g of N,N-dimethylacetoamide were added. The resulting reaction mixture was stirred at 160° C. for 16 hours under nitrogen flow to obtain a hydrophilic segment prepolymer HP13 solution. Here, the ratio of 4,4'-biphenol that is a dihydric phenol to the aromatic dichloride was 1.016:1. The resulting prepolymer concentration with respect to the total amount of the prepolymer and N,N-dimethylacetoamide was 18 wt %. After insoluble substance was filtered off, the resulting filtrate was poured into a large amount of 2-propanol to deposit a white solid product, which was then vacuum-dried at 100° C. and dissolved again in N,N-dimethylacetoamide. The processes of filtration, deposition with 2-propanol, and drying were repeated to obtain a prepolymer HP13 having sulfonic acid groups in potassium form. The $\eta_{sp/c}$ of HP13 was 0.89 dl/g. The ion-exchange capacity was 1.91 mmol/g.

Synthesis of Block Copolymer PB13

In a four-necked flask equipped with a stirrer, a Dean-Stark trap, a thermometer, and a nitrogen gas inlet, 6.05 g of HP13 and 55 g of N,N-dimethylacetoamide were charged. They were stirred at 80° C. overnight under nitrogen flow so as to dissolve HP13. After 0.029 g of potassium carbonate and 10 g of toluene added, the solution was heated and stirred at 160° C. under nitrogen flow to remove the generating water together with toluene. Separately, 7.36 g of "SUMIKAEXCEL 7600P" were dissolved in 36 g of N,N-dimethylacetoamide by stirring them at 80° C. overnight under nitrogen flow. Similarly, 10 g of toluene were added so as to dehydrate the resulting solution. In this way, a hydrophobic segment prepolymer SP13 solution was obtained. The SP13 solution was added to the HP13 solution, and then the mixed solution was stirred at 160° C. for 2 hours. After insoluble substance was filtered off, the resulting filtrate was poured into a large amount of water to deposit a white solid product, which was then filtered off. Thus obtained solid product was washed in hot water twice, and in methanol once, whereby a block copolymer PB13 was obtained. The solution viscosity $\eta_{sp/c}$ of the obtained polymer was 1.09 dl/g. The ion-exchange capacity was 0.643 mmol/g.

Sulfonation of Block Copolymer PB 13 (SPB 13 Synthesis)

In 63.6 g of 95% sulfuric acid 7.07 g of the block copolymer PB13 was dissolved, and the resulting solution was stirred at room temperature for 48 hours. The solution was poured into a large amount of water to deposit a white solid product, which was then filtered off. Thus obtained solid was washed in water 5 times to obtain a polymer SPB13. If the polymer is a blend, the hydrophilic polymer that is water-soluble is removed by water washing after sulfonation and the yield is largely lowered. However, the yield of SPB13 was 94% of the calculated value obtained by assuming that one sulfonic acid group was incorporated into each of the biphenol residue aromatic rings of PB13 before sulfonation. This indicates that SPB13 is not a blend, but the hydrophilic segment and hydrophobic segment are bonded together. The ion-exchange capacity was 1.72 mmol/g. In addition, in the membrane prepared by the method described below, a phase-separation structure was observed by TEM observation. Hence, SPB13 was identified to be a block copolymer. The hydrophobic segment is not sulfonated under the foregoing sulfonation conditions. Therefore, only the hydrophilic segment is considered to have sulfonic acid groups. Based on the SPB13 composition obtained by the H-NMR measurement, the hydrophilic segment weight fraction after the sulfonic acid groups were converted to $SO_3H$ was 0.46. The ion-exchange capacity of the hydrophilic segment of SPB13 was 4.20 mmol/g.

SPB13 was dissolved in N,N-dimethylacetoamide to obtain a 20 wt % solution, which was then cast on a glass plate and dried at 120° C. for 1 hour. After the resulting self-supporting membrane was peeled off from the glass plate and fixed on a metal frame, the membrane was further dried with hot air at 200° C. for 0.5 hour. The resulting membrane was immersed in a 0.5 N sodium hydroxide aqueous solution at room temperature for 2 hours, water-washed, and then immersed in a 1 N sulfuric acid aqueous solution for 4 hours. The membrane was water-washed 3 times. After the washing water was confirmed to be neutral, the membrane was fixed on a metal frame and dried at 40° C. to obtain a 21 nm thick membrane. The proton conductivity was measured at 70° C. with changing the relative humidity. The results are shown in Table 3.

Example 14

Synthesis of Prepolymer HP14

In a four-necked flask equipped with a stirrer, a Dean-Stark trap, a thermometer, and a nitrogen gas inlet, 8.93 g (0.048 mol) of 4,4'-biphenol and 80 g of 1,3-dimethyl-2-imidazolidinone were charged. They were stirred at 60° C. with nitrogen gas bubbling and dissolved. After 20 ml (0.1 mol NaOH) of a 4.8 N sodium hydroxide aqueous solution was added, and the mixture was stirred at 100° C. for 1 hour to obtain a uniform solution. After 40 ml of toluene was added, the solution was heated and stirred at 140° C. to 170° C. under nitrogen flow so as to remove the generating water together with toluene. After that, 9.38 g (0.033 mol) of bis(4-chlorophenyl)sulfone, 7.12 g (0.0145 mol) of 3,3'-disulfo-4,4'-dichlorodiphenylsulfone sodium salt, and 40 g of 1,3-dimethyl-2-imidazolidinone were added. The resulting reaction mixture was stirred at 180° C. for 16 hours under nitrogen flow to obtain a hydrophilic segment prepolymer HP14 solution. Here, the ratio of 4,4'-biphenol that is a dihydric phenol to the aromatic dichloride was 1.016:1. The resulting prepolymer concentration with respect to the total amount of the prepolymer and 1,3-dimethyl-2-imidazolidinone in the HP14 solution was 15 wt %. After insoluble substance was filtered off, the resulting filtrate was poured into a large amount of 2-propanol to deposit a solid product, which was then vacuum-dried at 100° C. The solid product was washed with 2-propanol and ethanol repeatedly, and then vacuum-dried at 100° C. After the resulting solid was stirred in 1 N sulfuric acid, the solid was washed with a large amount of water and vacuum-dried at 100° C. to obtain a prepolymer HP14 having sulfonic acid groups in H form. The $\eta_{sp/c}$ of HP14 was 0.31 dl/g. The ion-exchange capacity was 1.30 mmol/g.

Synthesis of Block Copolymer PB 14

In a four-necked flask equipped with a stirrer, a Dean-Stark trap, a thermometer, and a nitrogen gas inlet, 5.0 g of a prepolymer HP14 having sulfonic acid group in H form and 25 g of dimethylsulfoxide were charged. They were stirred at 120° C. under nitrogen flow so as to dissolve the HP14. After 1.04 g of potassium carbonate and 5 g of toluene added, the solution was heated and stirred at 175° C. under nitrogen flow to remove the generating water together with toluene. Separately, 7.5 g of "SUMIKAEXCEL 7600P" were dissolved in 30 g of dimethylsulfoxide by stirring them at 170° C. under nitrogen flow. Similarly, the resulting solution was dehydrated by adding 5 g of toluene so as to obtain a hydrophobic segment prepolymer SP14 solution. To the SP14 solution were added the HP14 solution and 4 g of dimethylsulfoxide, and then the mixed solution was stirred at 175° C. for 2 hours. After insoluble substance was removed by filtration, the resulting filtrate was poured into a large amount of water to deposit a white solid product, which was then filtered off. Thus obtained solid product was washed in hot water twice, and in methanol once, whereby a block copolymer PB14 was obtained. The ion-exchange capacity of the obtained polymer was 0.21 mmol/g.

Sulfonation of Block Copolymer PB14 (SPB14 Synthesis)

In 36 g of 95% sulfuric acid 4 g of the block copolymer PB14 was dissolved, and the resulting solution was stirred at room temperature for 48 hours. The solution was poured into a large amount of water to deposit a white solid product, which was then filtered off. Thus obtained solid was washed in water 5 times to obtain a polymer SPB14. The ion-exchange capacity of the obtained polymer was 1.68 mmol/g. If the polymer is a blend, the hydrophilic polymer that is water-soluble is removed by water washing after sulfonation and the ion-exchange capacity is largely lowered. However, the ion-exchange capacity of SPB14 gave almost the same value as the calculated value, 1.77 mmol/g obtained by assuming that one sulfonic acid group was incorporated into each of the biphenol residue aromatic rings of PB14 before sulfonation. This indicates that SPB14 is not a blend, and that the hydrophilic segment and hydrophobic segment are bonded together. In addition, in the membrane prepared by the method described below, a phase-separation structure was observed by TEM observation. Hence, SPB14 was identified to be a block copolymer. The hydrophobic segment is not sulfonated under the foregoing sulfonation conditions. Therefore, only the hydrophilic segment is considered to have sulfonic acid groups. Based on the SPB14 composition obtained by the H-NMR measurement, the hydrophilic segment weight fraction after the sulfonic acid groups were converted to $SO_3H$ was 0.43. The ion-exchange capacity of the hydrophilic segment of SPB14 was 3.91 mmol/g.

Comparative Example 6

In a four-necked flask equipped with a stirrer, a Dean-Stark trap, a thermometer, and a nitrogen gas inlet, 13.58 g (0.028 mol) of 3,3'-disulfo-4,4'-dichlorodiphenylsulfone sodium salt in place of 3,3'-disulfo-4,4'-dichlorodiphenylsulfone potassium salt, 7.94 g (0.028 mol) of bis(4-chlorophenyl) sulfone, 10.46 g (0.0562 mol) of 4,4'-biphenol, and 9.78 g of potassium carbonate were charged. After 100 g of dimethylsulfoxide and 45 g of toluene were added, the reaction mixture was heated and stirred under a nitrogen gas atmosphere. The temperature was elevated to 160° C. while removing the generating water together with toluene, and then the reaction mixture was stirred at that temperature for 8 hours to prepare a hydrophilic segment prepolymer HP14' solution. Here, the ratio of 4,4'-biphenol that is a dihydric phenol to the aromatic dichloride was 1.016:1. The resulting prepolymer concentration with respect to the total amount of the prepolymer and dimethylsulfoxide in the HP14' solution was 21.8 wt %.

Separately, 38.52 g of "SUMIKAEXCEL 7600P" were dissolved in 160 g of dimethylsulfoxide and 70 g of toluene, and then the resulting solution was heated and stirred under nitrogen flow. The temperature was elevated to 185° C. while removing the flowing water together with toluene, and then the solution was stirred at that temperature for 8 hours to prepare a hydrophobic segment prepolymer SP14' solution. The concentration of the prepolymer SP14' with respect to the total amount of the prepolymer SP14' and dimethylsulfoxide was 20.0 wt %. The SP14' solution was added to the HP14' solution, and then the mixed solution was stirred at 160° C. for 2 hours. The solution was poured into a large amount of water to deposit a white solid product, which was then filtered off. Thus obtained solid product was washed in hot water twice, and in methanol once, whereby a polymer PB 14' was obtained. The solution viscosity η sp/c of the obtained polymer was 0.52 dl/g.

In 90 g of 98% sulfuric acid, 10 g of the polymer PB 14' were dissolved, and the resulting solution was stirred at room temperature for 48 hours. The solution was poured into a large amount of water to deposit a white solid product, which was then filtered off. Thus obtained solid product was washed in water 5 times to obtain a polymer SPB14'. The ion-exchange capacity of SPB14' was not able to be measured by titration. This is because, in the case where HP14' having sulfonic acid group in sodium salt form were used, block copolymerization did not proceed, and almost all of the water-soluble hydrophilic polymer having sulfonic acid groups incorporated therein were removed by water washing after sulfonation. In addition, in the H-NMR measurement, the signals derived from the hydrophilic segment were hardly observed.

Comparative Example 7

In a four-necked flask equipped with a stirrer, a Dean-Stark trap, a thermometer, and a nitrogen gas inlet, 8.924 g (0.048 mol) of 4,4'-biphenol and 50 g of dimethylsulfoxide were charged. They were stirred at 60° C. with nitrogen gas bubbling and dissolved. After 20 ml (0.096 mol of NaOH) of a 4.794 N sodium hydroxide aqueous solution was added, and the mixture was stirred at 100° C. for 1 hour to obtain a uniform solution. After 60 ml of toluene was added, the solution was heated and stirred at 150° C. to 170° C. under nitrogen flow so as to remove the generating water together with toluene. After that, a solution prepared by dissolving 6.77 g (0.0236 mol) of bis(4-chlorophenyl)sulfone and 11.585 g (0.0236 mol) of 3,3'-disulfo-4,4'-dichlorodiphenylsulfone sodium salt in 40 g of dimethylsulfoxide was added. Separately, another 10 g of dimethylsulfoxide were also added. The resulting reaction mixture was stirred at 180° C. for 1616 hours under nitrogen flow to obtain a hydrophilic segment prepolymer HP15' solution. Here, the ratio of 4,4'-biphenol that is a dihydric phenol to the aromatic dichloride was 1.016:1. The resulting prepolymer concentration in the HP15' solution with respect to the total amount of the prepolymer and dimethylsulfoxide was 19 wt %.

Separately, 33.5 g of "SUMIKAEXCEL 7600P" were dissolved in 134 g of dimethylsulfoxide. After 50 ml of toluene was added, the resulting mixture was heated and stirred under a nitrogen gas atmosphere. The temperature of the mixture was elevated to 170° C. while removing the flowing water together with toluene, and further stirred at that temperature for 2 hours to obtain a hydrophobic segment prepolymer SP15' solution. The prepolymer SP15' concentration in the SP15' solution with respect to the total amount of the prepolymer and dimethylsulfoxide was 20 wt %. To the SP15' solution, the HP15' solution and 20 g of dimethylsulfoxide were added, and then the resulting mixture was stirred at 160° C. to 170° C. for 3 hour. After insoluble substance was removed by filtration, the resulting filtrate was poured into a large amount of water to deposit a white solid product, which was then filtered off. Thus obtained solid product was washed in hot water twice, and in methanol once, whereby a polymer PB15' was obtained.

In 18 g of 95% sulfuric acid, 2 g of the polymer PB15' were dissolved, and the resulting solution was stirred at room temperature for 24 hours. The solution was poured into a large amount of water to deposit a white solid product, which was then filtered off. Thus obtained solid was washed in water 5 times to obtain a polymer SPB15'. The ion-exchange capacity of the obtained polymer was 0.209 mmol/g. The ion-exchange capacity was largely lowered as compared with the calculated ion-exchange capacity of 1.89 mmol/g obtained by assuming that one sulfonic acid group was incorporated into each of the biphenol residue aromatic rings of PB15' before sulfonation. In this case, block copolymerization did not proceed and PB15' was formed as a blend, because HP15' having sulfonic acid groups in sodium salt form were used for the block copolymerization. This indicates that much of the water-soluble hydrophilic polymer was removed by water washing after sulfonation.

Referenced Example 3

In 180 g of 98% sulfuric acid, 20 g of "SUMIKAEXCEL 7600P" were dissolved, and the resulting solution was stirred at room temperature for 24 hours. The solution was poured into a large amount of water to deposit a white solid product, which was then filtered off. Thus obtained solid product was washed in water 5 times. The ion-exchange capacity of the obtained polymer was not able to be measured. Incorporation of sulfonic acid groups was not identified.

Referenced Example 4

In dimethylsulfoxide 6.1 g of the hydrophilic prepolymer HP13 obtained in Example 13 and 7.4 g of "SUMIKAEXCEL 7600P" were mixed and dissolved at room temperature to obtain a 20 wt % solution. The solution was poured into water to obtain a solid product. A blend composed of a hydrophilic prepolymer and a hydrophobic prepolymer was prepared. In 90 g of 98% sulfuric acid 10 g of the obtained blend were dissolved. After the resulting solution was stirred at room temperature for 24 hours, the solution was poured into a large amount of water to deposit a white solid product, which was then filtered off. The resulting solid product was washed in water 5 times. The ion exchange-capacity of the obtained polymer was not able to be measured. In the H-NMR measurement, only the signals derived on the hydrophobic prepolymer were observed. This result indicates that, in the case of a blend that is not a block copolymer, the hydrophilic prepolymer becomes water-soluble after sulfonation, and is removed in the water-washing process.

TABLE 3

| Proton conductivity for Example 12 and Example 13 (70° C.) | | |
|---|---|---|
| Relative Humidity | Proton conductivity (Scm$^{-1}$) | |
| RH % | Example 12 | Example 13 |
| 90 | $2.62 \times 10^{-1}$ | $2.07 \times 10^{-1}$ |
| 50 | $2.70 \times 10^{-2}$ | $2.03 \times 10^{-2}$ |
| 30 | $6.55 \times 10^{-3}$ | $3.66 \times 10^{-3}$ |

Example 15

Polymerization of Block Polymer PB15

In a flask, 28.7 g of bis(4-chlorophenyl)sulfone, 18.9 g of 4,4'-biphenol, and 16.8 g of potassium carbonate were charged. After 160 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to prepare a polymer solution A. Separately, a solution was prepared by dissolving 73 g of "SUMIKAEXCEL 7600P" in 290 ml of dimethylsulfoxide. This solution was added to the polymer solution A, and the mixed solution was stirred at 170° C. for 1.5 hours. The solution was poured into a large amount of water to deposit a white solid product, which was then filtered off. The solid product was washed in hot water twice, and in methanol once to obtain a block polymer PB15. The solution viscosity $\eta_{sp/c}$ of the obtained polymer was 0.71 dl/g.

Sulfonation of Block Polymer PB 15 (SPB 15 Synthesis)

20 g of the block polymer PB15 were dissolved in 200 ml of 98% sulfuric acid, and the resulting solution was stirred at room temperature for 24 hours. The solution was poured into a large amount of water to deposit a white solid product, which was then filtered off. Thus obtained solid was washed in water 5 times to obtain a polymer SPB15. The ion-exchange capacity of the polymer was 1.43 mmol/g. In the membrane prepared by the method described below, a phase-separation structure was observed by TEM observation. Hence, the polymer was identified to be a block copolymer.

Membrane Preparation and Peeling Properties Test

SPB15 was dissolved in N,N-dimethylacetoamide to obtain a 20 wt % solution. To the solution, monostearylphosphate triethanolamine salt was added in an amount of 0.5 wt % with respect to the polymer component to obtain a SPB15 solution. The solution was cast on a stainless steel plate (SUS304, 2 mm thick, 0.8 S of surface finish), and dried with hot air at 130° C. for 1 hour. The resulting membrane was able to be peeled off from the stainless steel plate easily.

Alkali Aqueous Solution Treatment and Acid Treatment

The resulting membrane was fixed on a stainless steel frame and heated at 200° C. for 30 minutes. The membrane was detached from the frame, immersed in a 1 N NaOH aqueous solution at 25° C. for 2 hours, water-washed, and then immersed in a 1 N $H_2SO_4$ aqueous solution for 4 hours. After water-washed twice, the membrane was fixed on a stainless steel frame and dried at 50° C. Thus obtained membrane had a thickness of 35 nm and a proton conductivity of $8.0 \times 10^{-3}$ S/cm at 60% RH. On the other hand, the membrane obtained after the heating at 200° C. for 30 minutes had a proton conductivity of $2.3 \times 10^{-3}$ S/cm under the same condition.

Comparative Example 8

A membrane was prepared in the same manner as in Example 15, except that monostearylphosphate triethanolamine salt was not added. The membrane firmly adhered to the stainless steel plate. The membrane was tried to be peeled off, but the membrane was broken off from the edge.

Example 16

Synthesis of Random Copolymer PR2

25.42 g of bis(4-fluorophenyl)sulfone, 15.93 g of bis(4-hydroxyphenyl) sulfone, and 6.77 g of 4,4'-biphenol were charged; after 170 ml of dimethylsulfoxide and 50 ml of toluene were added, the reaction mixture was heated and stirred under a nitrogen gas atmosphere. The temperature was elevated to 175° C. while removing the generating water together with toluene, and then the reaction mixture was stirred at that temperature for 16 hours to prepare a polymer solution. The solution was poured into a large amount of water to deposit a white solid product, which was then filtered off. Thus obtained solid product was washed in hot water twice, and in methanol once, whereby a polymer PR2 was obtained. The solution viscosity $\eta_{sp/c}$ of the obtained polymer PR2 was 0.53 dl/g.

Sulfonation of Random Copolymer PR2

In 200 ml of 98% sulfuric acid 20 g of the random copolymer PR2 were dissolved, and the resulting solution was stirred at room temperature for 24 hours. The solution was poured into a large amount of water to deposit a white solid product, which was then filtered off. Thus obtained solid product was washed in water 5 times to obtain a polymer SPR2. The ion-exchange capacity of the polymer was 1.41 mmol/g. In the membrane prepared by the method described below, a phase-separation structure was not observed, and the membrane was found to be uniform by TEM observation. Hence, the polymer was identified to be a random copolymer.

SPR2 was dissolved in N,N-dimethylacetoamide to prepare a 20 wt % solution. "SEPARL 365" (manufactured by Chukyo Yushi Co., Ltd.) was added to the solution in an amount of 0.3 wt % with respect to the polymer component to prepare a SPR2 solution. The solution was then cast on a stainless steel plate (SUS304, 2 mm thick, 0.8 of surface finish), and dried with hot air at 130° C. for 1 hour. The resulting membrane was able to be peeled off from the stainless steel plate easily. The thickness of the membrane was 38 nm.

Comparative Example 9

A membrane was prepared in the same manner as in Example 16, except that "SEPARL 365" was not added. The resulting membrane firmly adhered to the stainless steel plate. The membrane was tried to be peeled off, but the membrane was broken off from the edge. The thickness of the membrane was 37 nm.

Example 17

In 100 ml of 98% sulfuric acid, 10 g of a commercially available poly(oxy-1,4-phenyleneoxy-1,4-phenylenecarbonyl-1,4-phenylene) (available from Aldrich, 20,800 of weight average molecular weight, 10,300 of number average molecular weight, and 322° C. of melting point) were dissolved. The resulting solution was stirred at room temperature for 45 hours. A polymer was deposited from the solution with water, and was washed with a large amount of water until the pH of the washing water became neutral. The resulting polymer was vacuum-dried at 60° C. to obtain a sulfonated polyetheretherketone. The ion-exchange capacity of the obtained polymer was 1.54 mmol/g.

The sulfonated polyetheretherketone was dissolved in N-methyl-2-pyrolidone to obtain a 20 wt % solution. "SEPARL 365" was added in an amount of 0.5 wt % with respect to the polymer component to prepare a solution. The solution was cast on a stainless steel plate (SUS304, 2 mm thick, 0.8 of surface finish), dried with hot air at 130° C. for 1 hour. The resulting membrane was able to be peeled off from the stainless steel plate easily. The thickness of the membrane was 30 nm.

Comparative Example 10

A membrane was prepared in the same manner as in Example 17, except that "SEPARL 365" was not added. The resulting membrane firmly adhered to the stainless steel plate. The membrane was tried to be peeled off, but the membrane was broken off from the edge. The thickness of the membrane was 33 nm.

Example 18

13.41 g of 1,4,5,8-Naphthalenetetracarboxylic dianhydride, 17.62 g of an aromatic diamine having the following formula, 4.87 g of 1,3-bis(4-aminophenoxy)benzene, 155 g of m-cresol, and 12 g of triethylamine were stirred at 80° C. under nitrogen flow (30 mL/min) until a uniform solution was obtained. The temperature of the resulting solution was elevated to 175° C. and the solution was stirred for 24 hours to obtain a sulfonated polyimide solution. To 100 g of the obtained viscous solution (20.8 wt % of solid content, as calculated by assuming that the sulfonic acid groups were in a triethylamineamine salt form), "SEPARL 365" was added in an amount of 0.2 wt % with respect to the polymer component to obtain a solution. The solution was cast on a stainless steel plate (SUS304, 2 mm thick, 0.8 of surface finish), and dried with hot air at 130° C. for 1 hour. The resulting membrane was able to be peeled off from the stainless steel plate easily. The thickness of the membrane was 27 μm.

[Formula 29]

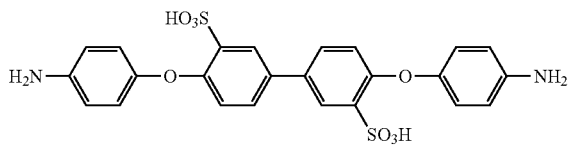

Comparative Example 11

A membrane was prepared in the same manner as in Example 18, except that "SEPARL 365" was not added. The resulting membrane firmly adhered to the stainless steel plate. The membrane was tried to be peeled off, but the membrane was broken off from the edge. The thickness of the membrane was 27 μm.

Example 19

Polymerization of Polyethersulfone Block Copolymer PB19

In a four-necked flask equipped with a stirrer, a Dean-Stark trap, a thermometer, and a nitrogen gas inlet, 10.71 g of bis(4-fluorophenyl)sulfone, 27.5 g of 3,3'-disulfo-4,4'-difluorodiphenylsulfone sodium salt, 18.9 g of 4,4'-biphenol, and 17.5 g of potassium carbonate were charged; after 210 ml of dimethylsulfoxide and 50 ml of toluene were added, the reaction mixture was heated and stirred under nitrogen flow. The temperature was elevated to 175° C. while removing the generating water together with toluene, and then the reaction mixture was stirred at that temperature for 16 hours to prepare a hydrophilic prepolymer HP19 solution. Separately, 81.47 g of bis(4-fluorophenyl)sulfone, 78.99 g of bis(4-hydroxyphenyl) sulfone, and 52 g of potassium carbonate were charged. After 600 ml of dimethylsulfoxide and 50 ml of toluene were added, the reaction mixture was heated and stirred under nitrogen flow. The temperature was elevated to 175° C. while removing the generating water together with toluene, and then the reaction mixture was stirred at that temperature for 16 hours to prepare a hydrophobic prepolymer SP19 solution. The SP19 solution was added to the HP19 solution, and the mixed solution was stirred at 170° C. for 1.5 hours. The solution was poured into a large amount of water to deposit a white solid product, which was then filtered off. Thus obtained solid product was washed in hot water twice, and in methanol once to obtain a block copolymer PB19. The solution viscosity $\eta_{sp/c}$ of the obtained polymer was 0.61 dl/g. The ion-exchange capacity was 0.59 mmol/g.

Sulfonation of Block Copolymer PB 19 (SPB19 Synthesis)

In 200 ml of 98% sulfuric acid, 20 g of the block copolymer PB19 were dissolved, and the resulting solution was stirred at room temperature for 24 hours. The solution was poured into a large amount of water to deposit a white solid product, which was then filtered off. Thus obtained solid was washed in water 5 times to obtain a sulfonated block copolymer SPB19 composed of a hydrophilic segment having the random copolymer structure represented by the following formula (30) and a hydrophobic segment having the structural unit represented by the following formula (31). The ion-exchange capacity of the obtained polymer was 1.46 mmol/g. If the polymer is a blend, the hydrophilic polymer that is water-soluble is removed by water washing after sulfonation and the ion-exchange capacity is largely lowered. However, the ion-exchange capacity of SPB19 gave almost the same value as the calculated value, 1.49 mmol/g obtained by assuming that one sulfonic acid group was incorporated into each of the biphenol residue aromatic rings of PB19 before sulfonation. This indicates that SPB19 is not a blend, and that the hydrophilic segment and hydrophobic segment are bonded together. In addition, in the membrane prepared in the same manner as described below, a phase-separation structure was observed by TEM observation. Hence, SPB19 was identified to be a block copolymer. The hydrophobic segment is not sulfonated under the foregoing sulfonation conditions, so that only the hydrophilic segment has sulfonic acid groups.

[Formula 30]

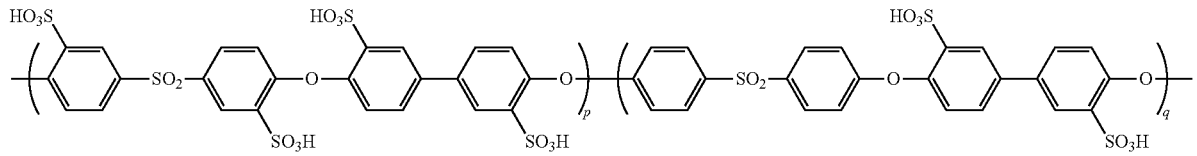

(30)

wherein, p and q, each represents a mole fraction of each structural unit; and p=0.6 and q=0.4.

[Formula 31]

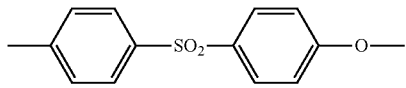

(31)

<Membrane Preparation>

SPB19 and "SEPARL 365" in an amount 0.5 wt % with respect to the polymer component were dissolved in N,N-dimethylacetoamide to prepare a 20 wt % solution. The solution was cast on a stainless steel plate (SUS304, 2 mm thick, 0.8 of surface finish), and dried with a hot air at 130° C. for 1 hour. The membrane was able to be peeled off from the stainless steel plate easily. The thickness of the membrane was 24 μm.

Comparative Example 12

A membrane was prepared in the same manner as in Example 17, except that "SEPARL 365" was not added. The resulting membrane firmly adhered to the stainless steel plate. The membrane was tried to be peeled off, but the membrane was broken off from the edge. The thickness of the membrane was 27 μm.

INDUSTRIAL APPLICABILITY

The present invention provides a sulfonated aromatic polymer electrolyte that is inexpensive and durable and keeps high proton conductivity, a membrane of the polymer electrolyte, and a use thereof.

Further, the present invention provides a polymer electrolyte composition that does not lower largely proton conductivity at low humidity, a membrane that is composed of the polymer electrolyte composition, and a fuel cell using them.

Still further, the present invention provides a method for producing a sulfonated polyarylether block copolymer that is inexpensive and durable and keeps high proton conductivity, and a block copolymer obtained by the method.

Still further, the present invention provides a method for producing a polymer electrolyte membrane, wherein a self-supporting membrane can be easily peeled off from a support such as a metal belt, for example a stainless steel belt, when a membrane composed of a polymer electrolyte having strong acid groups or superstrong acid groups is produced.

The invention claimed is:

1. A method for producing a sulfonated polyarylether block copolymer, said copolymer comprising a hydrophobic segment having a structural unit represented by formula (5) and a hydrophilic segment having a structural unit with sulfonic acid groups or derivative thereof incorporated into a structure represented by formula (6),

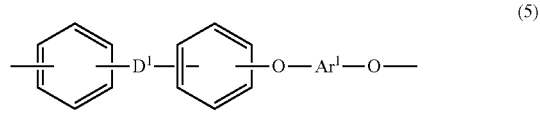

(5)

wherein,
$D^1$ is $SO_2$ or CO; and
$Ar^1$ is a divalent aromatic residue bonded to an electron-withdrawing group in every aromatic ring belonging to $Ar^1$,

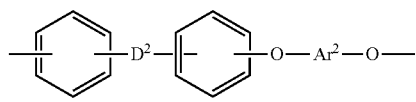

(6)

wherein,
$D^2$ of formula (6) is $SO_2$ or CO; and
$Ar^2$ is a divalent aromatic residue,
the method comprising block copolymerizing a hydrophilic segment prepolymer represented by formula (18) and a hydrophobic segment prepolymer, the block copolymerization being conducted through ether exchange reaction,

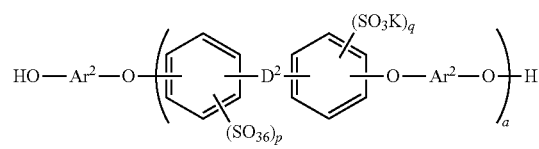

(18)

wherein
$D^2$ of formula (18) is $SO_2$ or CO;
$Ar^2$ is a divalent aromatic residue;
a is an integer of from 20 to 1,000;
p and q are independently an integer of 0, 1 or 2; and
p+q≥1,
wherein the hydrophilic segment prepolymer is prepared from a 3,3'-disulfo-4,4'-dichlorodiphenylsulfonate, and
wherein the sulfonated polyarylether block copolymer has an ion-exchange capacity of 0.5 mmol/g to 3.0 mmol/g.

2. The method for producing a sulfonated polyarylether block copolymer according to claim 1, wherein a terminal hydroxyl group of the hydrophilic segment prepolymer is reacted in a form of a potassium salt.

3. The method for producing a sulfonated polyarylether block copolymer according to claim 1, further comprising synthesizing the hydrophilic segment prepolymer using a potassium salt of a divalent sulfonated aromatic dichloride compound represented by formula (7):

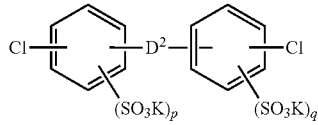

(7)

wherein
$D^2$ of formula (7) is $SO_2$ or CO;
p and q each are independently an integer of 0, 1, or 2; and
p+q≥1.

4. The method for producing a sulfonated polyarylether block copolymer according to claim 1, wherein the hydrophilic segment prepolymer has a structural unit [A] represented by formula (8) and a structural unit [B] represented by formula (9), and the weight ratio of [A]/[B] is in the range of from 10/0 to 1/9,

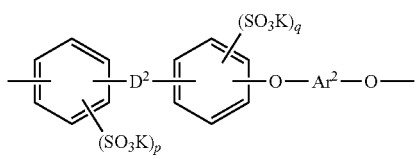

wherein
D² of formula (8) is SO₂ or CO;
p and q each are independently an integer of 0, 1, or 2;
p+q≥1; and
Ar² is a divalent aromatic residue,

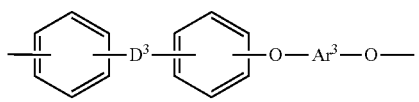

wherein
D³ is SO₂ or CO; and
Ar³ is a divalent aromatic residue.

5. The method for producing a sulfonated polyarylether block copolymer according to claim 1, wherein D¹, and D² are SO₂.

6. The method for producing a sulfonated polyarylether block copolymer according to claim 1, wherein the hydrophobic segment prepolymer is a polyarylethersulfone represented by formula (10):

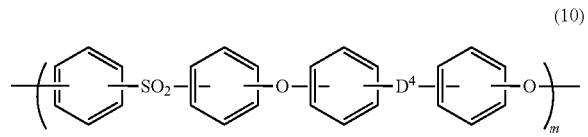

wherein
D⁴ is SO₂ or CO; and
m is an integer of from 3 to 1,500.

7. The method for producing a sulfonated polyarylether block copolymer according to claim 1, wherein the block copolymerization is conducted at a temperature of from 120° C. to 200° C.

8. The method for producing a sulfonated polyarylether block copolymer according to claim 1, wherein the block copolymerization is conducted at a temperature of from 140° C. to 190° C.

9. The method for producing a sulfonated polyarylether block copolymer according to claim 1, wherein a terminal group of the hydrophobic segment prepolymer comprises a hydroxyl group.

10. The method for producing a sulfonated polyarylether block copolymer according to claim 6, wherein D⁴ of formula (10) is SO₂.

11. The method for producing a sulfonated polyarylether block copolymer according to claim 1, wherein the sulfonated polyarylether block copolymer has a hydrophilic segment weight fraction of 0.1 to 0.8.

12. The method for producing a sulfonated polyarylether block copolymer according to claim 1, wherein the sulfonated polyarylether block copolymer has a hydrophilic segment weight fraction of 0.25 to 0.65.

13. The method for producing a sulfonated polyarylether block copolymer according to claim 1, wherein the sulfonated polyarylether block copolymer has an ion-exchange capacity of 0.7 mmol/g to 2.8 mmol/g.

14. The method according to claim 1, wherein the 3,3'-disulfo-4,4'-dichlorodiphenylsulfonate is a potassium salt.

* * * * *